「United States Patent」 Wada et al.

(10) Patent No.: US 12,058,444 B2
(45) Date of Patent: *Aug. 6, 2024

(54) IMAGING APPARATUS AND IMAGING METHOD

(71) Applicant: FUJIFILM Corporation, Tokyo (JP)

(72) Inventors: Tetsu Wada, Saitama (JP); Koichi Tanaka, Saitama (JP); Yukinori Nishiyama, Saitama (JP); Yuya Nishio, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,373

(22) Filed: May 15, 2023

(65) Prior Publication Data

US 2023/0283904 A1 Sep. 7, 2023

Related U.S. Application Data

(63) Continuation of application No. 17/689,718, filed on Mar. 8, 2022, now Pat. No. 11,696,033, which is a
(Continued)

(30) Foreign Application Priority Data

Sep. 20, 2019 (JP) ................................. 2019-171661

(51) Int. Cl.
*H04N 23/69* (2023.01)
*G03B 5/00* (2021.01)
(Continued)

(52) U.S. Cl.
CPC ............... *H04N 23/69* (2023.01); *G06T 7/20* (2013.01); *G06V 20/40* (2022.01); *H04N 5/2228* (2013.01);
(Continued)

(58) Field of Classification Search
CPC .................. G01S 3/7864; G03B 13/36; G03B 2205/0007; G03B 2205/0046; G03B 5/00;
(Continued)

(56) References Cited

U.S. PATENT DOCUMENTS 8,363,105 B2 * 1/2013 Ohnishi ................ G01S 3/7864
348/169
2006/0082656 A1 4/2006 Ochiai
(Continued)

FOREIGN PATENT DOCUMENTS

JP 2006-115323 A 4/2006
JP 2015-179988 A 10/2015
(Continued)

OTHER PUBLICATIONS

Japanese Notice of Reasons for Refusal for corresponding Japanese Application No. 2021-546533, dated May 16, 2023, with an English translation.
(Continued)

*Primary Examiner* — Amy R Hsu
(74) *Attorney, Agent, or Firm* — Birch, Stewart, Kolasch & Birch, LLP

(57) ABSTRACT

An imaging apparatus facilitating recording of a video within an extraction range while moving the extraction range within an angle of view are provided, which includes an image sensor that captures a reference video which is a motion picture, a housing that accommodates the image sensor, a detection portion for detecting a motion of the housing, and a processor configured to execute setting processing of setting an extraction range smaller than an angle of view within the angle of view in a case of capturing the reference video, extraction processing of extracting an extraction video within the extraction range from the reference video, movement processing of moving the extraction
(Continued)

range within the angle of view over time in accordance with the motion detected by the detection portion, and recording processing of recording the extraction video during movement of the extraction range in the movement processing on a recording medium.

14 Claims, 14 Drawing Sheets

Related U.S. Application Data continuation of application No. PCT/JP2020/028240, filed on Jul. 21, 2020.

(51) Int. Cl.
| | | |
|---|---|---|
| G06T 7/20 | (2017.01) | |
| G06V 20/40 | (2022.01) | |
| H04N 5/222 | (2006.01) | |
| H04N 5/262 | (2006.01) | |
| H04N 5/91 | (2006.01) | |
| H04N 23/51 | (2023.01) | |
| H04N 23/63 | (2023.01) | |
| H04N 23/68 | (2023.01) | |

(52) U.S. Cl.
CPC ............ *H04N 5/2628* (2013.01); *H04N 5/91* (2013.01); *H04N 23/51* (2023.01); *H04N 23/63* (2023.01); *H04N 23/6812* (2023.01); *H04N 23/683* (2023.01); *G03B 5/00* (2013.01); *G03B 2205/0046* (2013.01); *G06T 2207/10016* (2013.01); *G06V 2201/07* (2022.01)

(58) Field of Classification Search
CPC . G06T 2207/10016; G06T 7/20; G06V 10/17; G06V 20/40; G06V 2201/07; H04N 23/51; H04N 23/58; H04N 23/60; H04N 23/62; H04N 23/63; H04N 23/631; H04N 23/6812; H04N 23/683; H04N 23/687; H04N 23/69; H04N 23/698; H04N 5/2228; H04N 5/2628; H04N 5/772; H04N 5/91

See application file for complete search history.

(56) References Cited

U.S. PATENT DOCUMENTS

| | | | | |
|---|---|---|---|---|
| 2008/0111889 | A1* | 5/2008 | Fujita | H04N 23/68 |
| | | | | 348/E5.025 |
| 2009/0066804 | A1* | 3/2009 | Kurokawa | H04N 5/772 |
| | | | | 348/222.1 |
| 2009/0213231 | A1* | 8/2009 | Kurokawa | H04N 23/683 |
| | | | | 348/240.99 |
| 2010/0066860 | A1* | 3/2010 | Tsurumi | H04N 5/772 |
| | | | | 348/231.2 |
| 2011/0043654 | A1* | 2/2011 | Fujita | H04N 23/673 |
| | | | | 348/222.1 |
| 2011/0221914 | A1* | 9/2011 | Shinbo | H04N 21/4402 |
| | | | | 348/222.1 |
| 2015/0326794 | A1* | 11/2015 | Uemura | H04N 1/4076 |
| | | | | 348/240.99 |
| 2016/0336041 | A1 | 11/2016 | Mukai et al. | |

FOREIGN PATENT DOCUMENTS

| | | |
|---|---|---|
| JP | 2017-48355 A | 3/2017 |
| JP | 2019-22026 A | 2/2019 |
| JP | 2020-122883 A | 8/2020 |

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/028240, dated Mar. 31, 2022.
International Search Report (Form PCT/ISA/210) for International Application No. PCT/JP2020/028240, dated Oct. 20, 2020, with English translation.
U.S. Office Action for U.S. Appl. No. 17/689,718, dated Feb. 21, 2023 (Notice of Allowance).

* cited by examiner

FIRST SIDE ⟵   ⟶ SECOND SIDE

FIG. 14
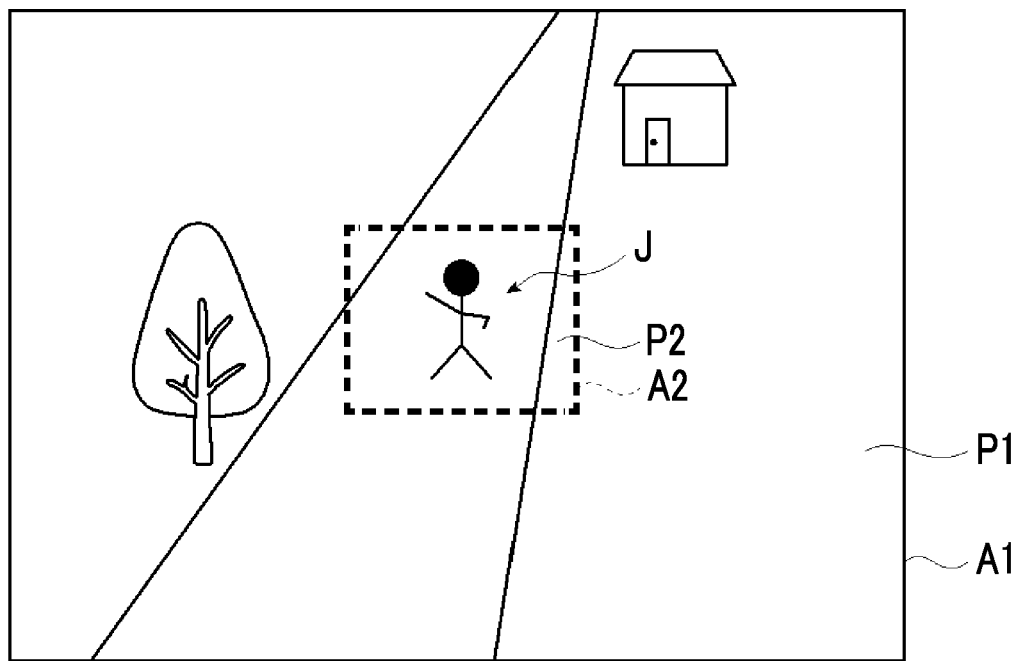
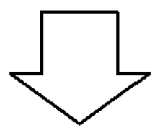
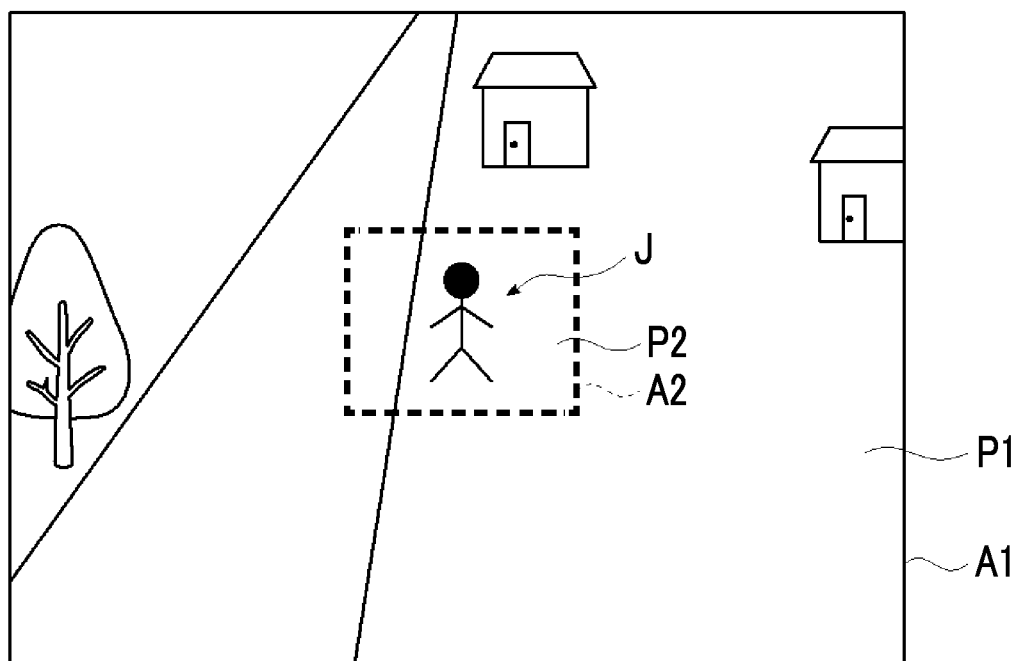

IMAGING APPARATUS AND IMAGING METHOD

CROSS-REFERENCE TO RELATED APPLICATIONS

This application is a Continuation of copending application Ser. No. 17/689,718, filed on Mar. 8, 2022, which a Continuation of PCT International Application No. PCT/JP2020/028240 filed on Jul. 21, 2020, which claims priority under 35 U.S.C. § 119(a) to Application No. 2019-171661, filed in Japan on Sep. 20, 2019, all of which are hereby expressly incorporated by reference into the present application.

BACKGROUND OF THE INVENTION

1. Field of the Invention

The present invention relates to an imaging apparatus that captures a video which is a motion picture, and an imaging method using an imaging apparatus.

2. Description of the Related Art

Among imaging apparatuses capturing videos that are motion pictures, there is an imaging apparatus that extracts a designated range from an imaging angle of view and records a video of the extraction range, such as imaging apparatuses disclosed in JP2017-46355A and JP2019-22026A.

The imaging apparatuses disclosed in JP2017-46355A and JP2019-22026A have a function of changing a position or the like of the extraction range within the angle of view at a predetermined speed. In a case where this function is used, for example, it is possible to track a subject in the video or cause an angle of the recorded video to slide in a certain direction without manually operating the imaging apparatuses during imaging.

SUMMARY OF THE INVENTION

In a case of recording the video within the extraction range while moving the extraction range, it is required to reduce an effort of performing an input operation or the like by a user as much as possible and more simply change the position or the like of the extraction range.

However, in the imaging apparatuses disclosed in JP2017-46355A and JP2019-22026A, an operation such as inputting various setting items is necessary before a start of movement of the extraction range or during movement of the extraction range.

In view of the above matter, the present invention is conceived to solve the following object.

An object of the present invention is to solve problems of the technology of the related art and provide an imaging apparatus and an imaging method that further facilitate recording of a video within an extraction range while moving the extraction range within an angle of view.

In order to accomplish the above object, an imaging apparatus according to an aspect of the present invention comprises an image sensor that captures a reference video which is a motion picture, a housing that accommodates the image sensor, a detector for detecting a motion of the housing, and a processor configured to execute setting processing of setting an extraction range smaller than an angle of view within the angle of view in a case of capturing the reference video, extraction processing of extracting an extraction video within the extraction range from the reference video, movement processing of moving the extraction range within the angle of view over time in accordance with the motion detected by the detector, and recording processing of recording the extraction video during movement of the extraction range in the movement processing on a recording medium.

According to the imaging apparatus according to the aspect of the present invention, the extraction range can be moved in accordance with the motion of the housing detected by the detector. Thus, recording of the extraction video while moving the extraction range within the angle of view is further facilitated.

In addition, the imaging apparatus according to the aspect of the present invention may further comprise a display that displays the extraction video. In this case, it is more preferable that the processor is configured to, in the movement processing, move the extraction range and display the extraction video during movement of the extraction range on the display.

In addition, the processor may be configured to, in a case where the detector has detected the motion, execute determination processing of determining whether or not an end of the extraction range reaches an end of the angle of view, and the processor may be configured to execute the movement processing in a case where a determination that the end of the extraction range reaches the end of the angle of view is made in the determination processing.

Furthermore, it is more preferable that the processor is configured to, in a case where the detector has detected movement of the housing to a first side of a horizontal direction as the motion, determine whether or not an end of the extraction range positioned on a second side opposite to the first side reaches an end of the angle of view positioned on the second side in the determination processing, and the processor is configured to move the extraction range to the first side in a case where a determination that the end of the extraction range reaches the end of the angle of view is made in the determination processing.

In addition, it is preferable that the processor is configured to, in the movement processing, move the extraction range at a movement speed corresponding to a time period from when the movement starts to when the end of the extraction range reaches the end of the angle of view.

In addition, the processor may be configured to, in a case where the detector has detected the motion, select a subject captured within the extraction video before and after detection of the motion as a tracking target and, in the movement processing, move the extraction range such that the subject enters within the extraction range.

Furthermore, it is more preferable that the processor is configured to, in a case where the subject deviates from the angle of view during execution of the movement processing, finish the movement processing.

In addition, it is more preferable that the processor is configured to, in the movement processing, move the extraction range while changing a size of the extraction range based on a ratio of a size of a video of the subject to the size of the extraction range.

In addition, the processor may be configured to, in a case where the detector has detected the motion of the housing during execution of the movement processing, further execute camera shake correction processing of performing camera shake correction on the extraction video during movement of the extraction range.

In addition, the processor may be configured to, in a case where the detector has detected the motion of the housing in a direction opposite to a movement direction of the extraction range during execution of the movement processing, finish the movement processing.

In addition, the processor may be configured to further execute zooming processing of performing zooming on a video of a subject within the extraction video, and in a case where the zooming processing is executed during execution of the movement processing, adjust a movement speed of the extraction range in accordance with the zooming in the movement processing.

In addition, according to an aspect of the present invention, an imaging apparatus comprising an image sensor that captures a reference video which is a motion picture, and a processor configured to execute setting processing of setting an extraction range smaller than an angle of view within the angle of view in a case of capturing the reference video, extraction processing of extracting an extraction video within the extraction range from the reference video, zooming processing of performing zooming on a video of a subject within the extraction video, movement processing of moving the extraction range within the angle of view over time at a movement speed corresponding to the zooming performed in the zooming processing, and recording processing of recording the extraction video during movement of the extraction range in the movement processing on a recording medium can also be implemented.

In addition, the imaging apparatus may further comprise a display that displays the extraction video. In this case, it is more preferable that the processor is configured to, in the movement processing, move the extraction range and display the extraction video during movement of the extraction range on the display.

In addition, in the imaging apparatus, the zooming processing may be processing of performing electronic zooming on the video of the subject by changing a size of the extraction range in accordance with a distance between the imaging apparatus and the subject within the extraction video, and the processor may be configured to, in the movement processing, move the extraction range at a movement speed corresponding to the electronic zooming.

In addition, in the imaging apparatus, the zooming processing may be processing of performing optical zooming on the video of the subject within the extraction video by moving a lens of the imaging apparatus along an optical axis, and the processor may be configured to, in the movement processing, move the extraction range at a movement speed corresponding to the optical zooming.

In addition, according to an aspect of the present invention, an imaging method using an imaging apparatus including an image sensor that captures a reference video which is a motion picture, the imaging method comprising a setting step of setting an extraction range smaller than an angle of view within the angle of view in a case of capturing the reference video, an extraction step of extracting an extraction video within the extraction range from the reference video, a movement step of moving the extraction range within the angle of view over time in accordance with a motion of the imaging apparatus detected by a detector, and a recording step of recording the extraction video during movement of the extraction range in the movement step on a recording medium can also be implemented.

According to the imaging apparatus and the imaging method according to the aspects of the present invention, recording of the video within the extraction range while moving the extraction range within the angle of view is further facilitated.

BRIEF DESCRIPTION OF THE DRAWINGS

FIG. 14 is a diagram illustrating a change in angle of view in a case where a user moves the imaging apparatus.

DESCRIPTION OF THE PREFERRED EMBODIMENTS

Figure 1:
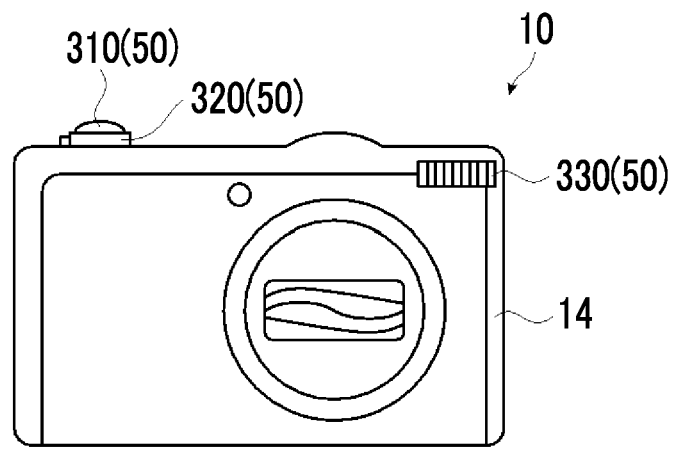
FIG. 1 is a diagram of an exterior of an imaging apparatus according to one embodiment of the present invention in a view from a front surface side.

Hereinafter, a preferred embodiment (hereinafter, referred to as a first embodiment) of the present invention will be described in detail with reference to the appended drawings. The embodiment described below is merely an example for facilitating understanding of the present invention and does not limit the present invention. That is, the present invention may be changed or improved from the embodiment described below without departing from a gist thereof. In addition, the present invention includes equivalents thereof.

In the present specification, a video is a motion picture, and the motion picture means a collection of a plurality of images (frame images) consecutively captured at a constant frame rate.

<<Basic Configuration of Imaging Apparatus>>

A basic configuration of an imaging apparatus (hereinafter, referred to as an imaging apparatus 10) according to the first embodiment will be described with reference to FIG. 1 to FIG. 4.

The imaging apparatus 10 is a portable imaging apparatus. Specifically, the imaging apparatus 10 is a digital camera having an exterior illustrated in FIGS. 1 and 2 and is used for capturing a still picture and a motion picture. In the present specification, a function of capturing a motion picture in real time will be mainly described among functions of the imaging apparatus 10.

The imaging apparatus 10 is configured with an imaging apparatus main body 12 and a housing 14. The imaging apparatus main body 12 is a part of the imaging apparatus 10 excluding the housing 14. The housing 14 has approximately the same structure as a housing of a general digital camera and accommodates an imaging portion 20 and a processing portion 30 illustrated in FIG. 3.

Figure 3:
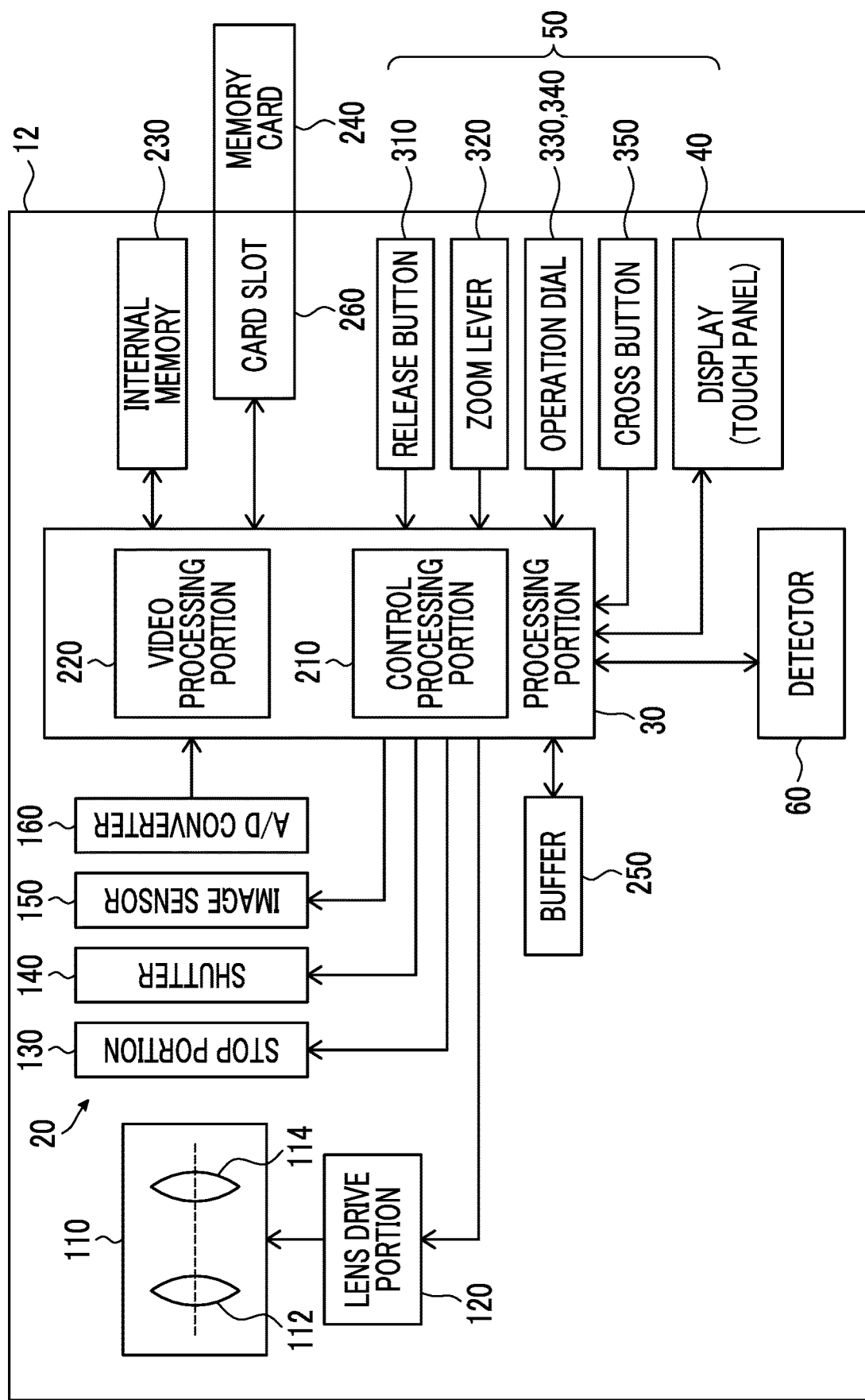
FIG. 3 is a diagram illustrating a configuration of an imaging apparatus main body comprised in the imaging apparatus according to one embodiment of the present invention.

The imaging portion 20 captures a video and includes a lens unit 110, a lens drive portion 120, a stop portion 130, a shutter 140, an image sensor 150, and an analog/digital (A/D) converter 160 as illustrated in FIG. 3.

The lens unit 110 includes a zoom lens 112 and a focus lens 114. In the first embodiment, the zoom lens 112 is equipped with an anamorphic lens. Thus, in the first embodiment, the video can be captured within an angle of view (for example, an angle of view having a width-to-height ratio of 2.35:1) that is wide in a lateral direction. The present invention is not limited to the anamorphic lens, and imaging lenses such as a wide angle lens, a ultra wide angle lens, and a 360-degree lens may be used. In addition, the lens unit 110 may be configured to be interchangeable with other lens units. In addition, the imaging portion 20 may comprise a plurality of lens units 110 having different angles of view.

Here, the angle of view in capturing the video using the image sensor 150 is decided in accordance with specifications and the like of the lens unit 110 and the image sensor 150, and the video captured within the angle of view corresponds to a "reference video" according to the embodiment of the present invention.

The lens drive portion 120 is configured with a drive motor, not illustrated, and a drive mechanism, not illustrated, and moves the lenses of the lens unit 110 along an optical axis.

The stop portion 130 adjusts a size of an opening portion in accordance with setting of a user or automatically, and adjusts a quantity of light passing through the opening portion.

The shutter 140 blocks light transmitted to the image sensor 150.

The image sensor 150 is configured with, for example, a charged coupled device (CCD) or a complementary metal oxide semiconductor image sensor (CMOS), forms an image by receiving light from a subject through the lens unit 110, and generates image data. Specifically, the image sensor 150 converts a light signal received through a color filter into an electric signal using a light-receiving element, amplifies the electric signal using an auto gain controller (AGC), and generates analog image data from the signal after amplification.

The A/D converter 160 converts the analog image data generated by the image sensor 150 into digital image data. The digital image data corresponds to data of a frame constituting the reference video that is a motion picture.

The number of pieces of pixel data (that is, the number of pixels) constituting the digital image data is not particularly limited and is the number of pixels greater than or equal to 10 million in the first embodiment. Preferably, a lower limit of the number of pixels may be greater than or equal to 60 million. In addition, a preferred upper limit of the number of pixels in the first embodiment is less than or equal to 1 billion and more preferably less than or equal to 5 billion. In a case where the number of pixels is above the lower limit, visibility of an extraction video (extraction video will be described later) extracted from the reference video can be secured. In addition, in a case where the number of pixels is below the upper limit, a pixel information amount of the reference video can be reduced, and a speed of processing of the processing portion 30 is increased.

The processing portion 30 executes various processing related to the imaging apparatus 10 and includes a control processing portion 210 and a video processing portion 220 in the first embodiment as illustrated in FIG. 3.

The processing portion 30 is configured with, for example, one or a plurality of processors and is specifically configured with a central processing unit (CPU) and a control program. The present invention is not limited thereto. The processor may be configured with a field programmable gate array (FPGA), a digital signal processor (DSP), an application specific integrated circuit (ASIC), a graphics processing unit (GPU), a micro-processing unit (MPU), or other integrated circuits (ICs), or may be configured with a combination thereof. In addition, as represented by a system on chip (SoC) or the like, the processor may be such that functions of the entire system including the control processing portion 210 and the video processing portion 220 are configured with one integrated circuit (IC) chip. Furthermore, a hardware configuration of each processor above may be implemented by an electric circuit (circuitry) in which circuit elements such as semiconductor elements are combined.

The control processing portion 210 controls each portion of the imaging apparatus main body 12 in accordance with an operation of the user or automatically, and, for example, can cause the imaging portion 20 to capture (acquire) the reference video by controlling the imaging portion 20. In addition, the control processing portion 210 can control the video processing portion 220 such that a video (specifically, the extraction video described later) is recorded on a recording medium. In addition, based on a contrast or the like of the entire or a part of an image indicated by the digital image data generated by the imaging portion 20, the control processing portion 210 can control the lens drive portion 120 to set a focal point of the lens unit 110 to focus on the subject in the image. In addition, based on brightness of the entire or a part of the image indicated by the digital image data generated by the imaging portion 20, the control processing portion 210 can control the stop portion 130 and automatically adjust an exposure amount at a time of imaging.

The video processing portion 220 performs processing such as gamma correction, white balance correction, and defect correction on the digital image data generated by the imaging portion 20 and furthermore, compresses the processed digital image data in a compression format complying with a predetermined standard. The video processing portion 220 acquires the reference video from the compressed digital image data that is sequentially generated during imaging, and executes various processing on the acquired reference video.

Figure 6:
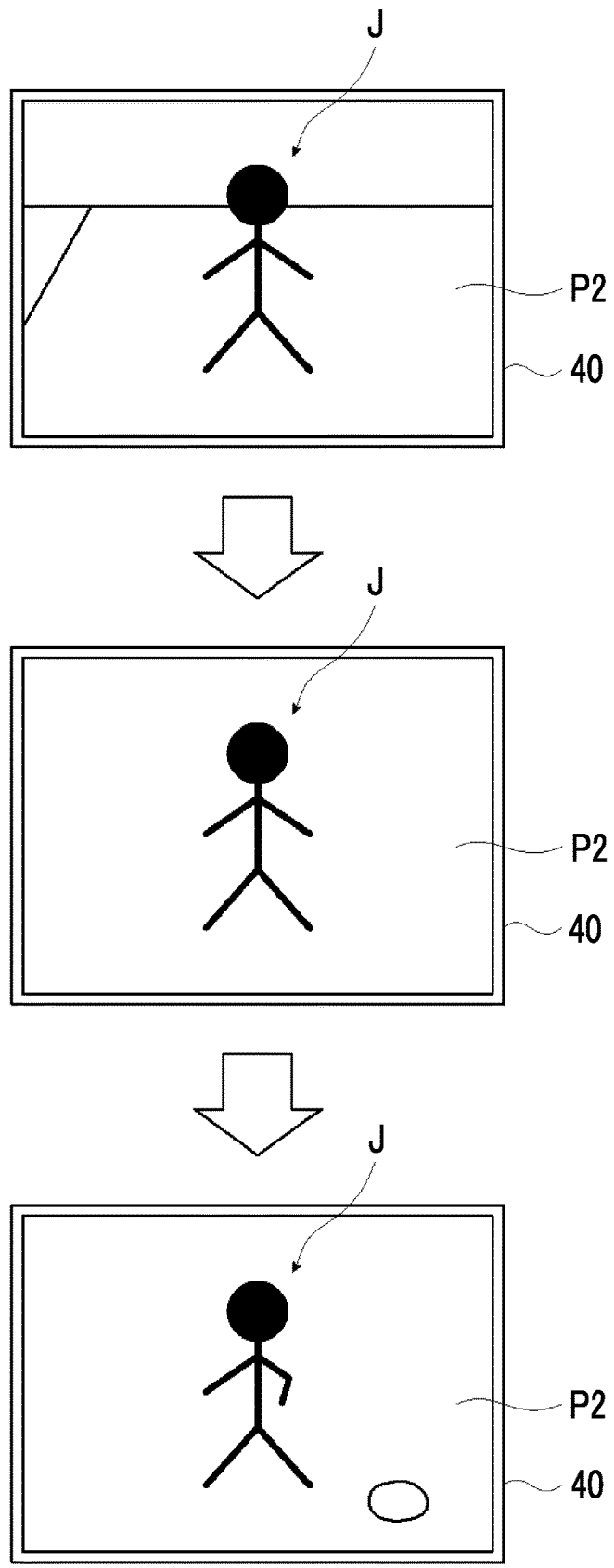
FIG. 6 is a diagram illustrating transitions of an extraction video in the case illustrated in FIG. 5.
Figure 8:
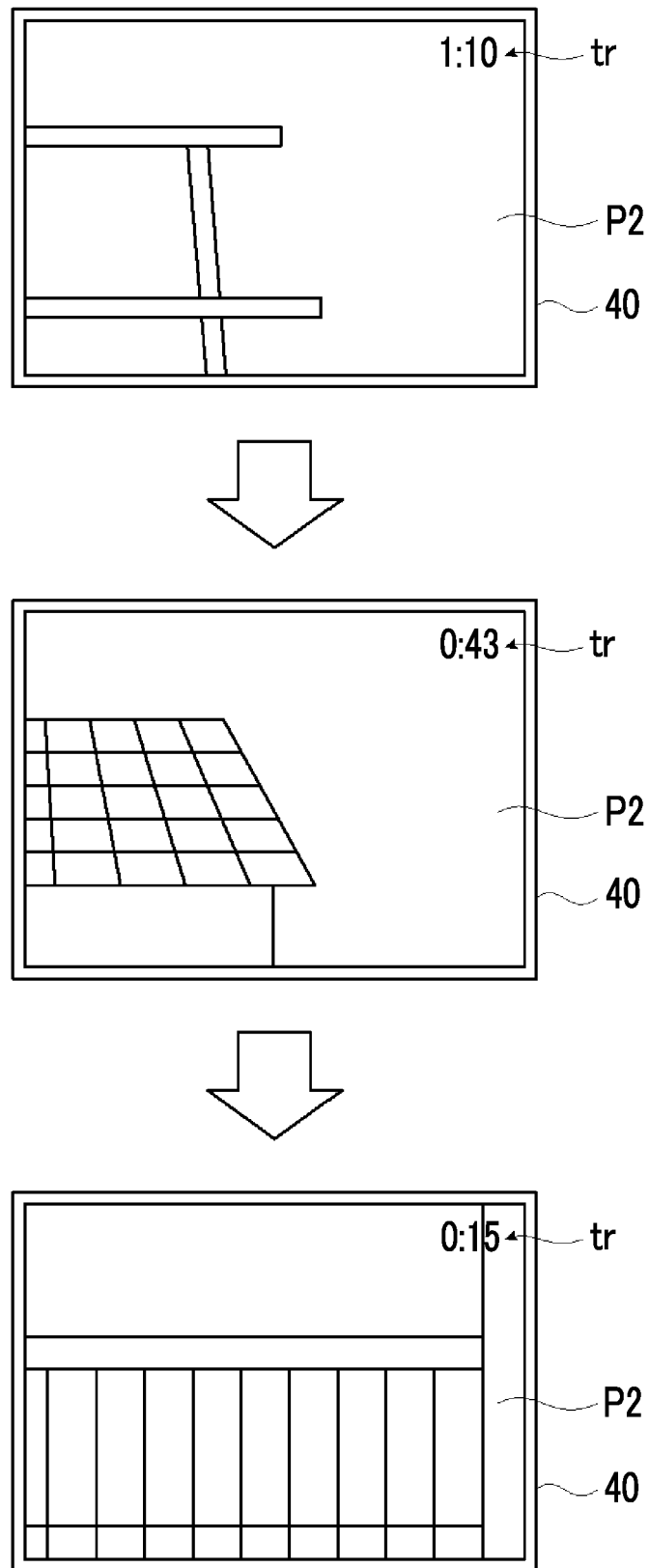
FIG. 8 is a diagram illustrating transitions of the extraction video in the case illustrated in FIG. 7.

In addition, the video processing portion 220 can set an extraction range smaller than the angle of view within the angle of view of the imaging portion 20 and extract the extraction video (so-called cropped image) captured within the extraction range from the reference video (for example, refer to FIG. 6 and FIG. 8). In addition, the video processing portion 220 can record (picture recording) the extraction video on the recording medium under control of the control processing portion 210. The extraction video will be described in detail in a later section.

In the following description, unless otherwise specified, processing of each of the control processing portion 210 and the video processing portion 220 will be described as processing performed by the processing portion 30 that is a processor according to the embodiment of the present invention. Processing performed by the processing portion 30 will be described in detail in a later section.

The housing 14 further accommodates an internal memory 230 incorporated in the imaging apparatus main body 12, a memory card 240 that is attachable to and detachable from the imaging apparatus main body 12 through a card slot 260, and a buffer 250. The internal memory 230 and the memory card 240 are the recording medium on which the extraction video is recorded, and are configured with a flash memory, a ferroelectric memory, and the like. The recording medium may be in a location other than the imaging apparatus main body 12. The processing portion 30 may record the video on an external recording medium through wired or wireless communication.

The buffer 250 functions as a work memory of the processing portion 30 and is configured with, for example, a dynamic random access memory (DRAM) or a ferroelectric memory.

Figure 2:
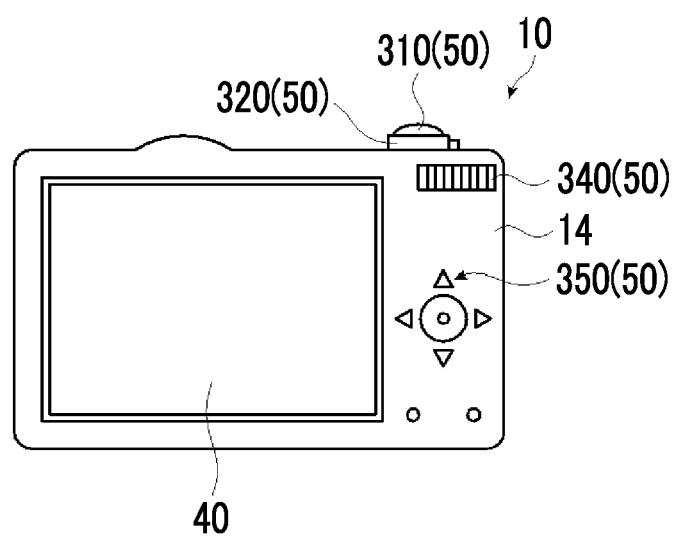
FIG. 2 is a diagram of the exterior of the imaging apparatus according to one embodiment of the present invention in a view from a rear surface side.

A display 40 is attached to a rear surface of the housing 14 as illustrated in FIG. 2. The display 40 is configured with a liquid crystal display (LCD), an organic electroluminescence (EL) display, a light emitting diode (LED) display, an electronic paper, or the like. The display 40 displays the extraction video and also appropriately displays a setting screen for an imaging condition and the like, a screen for mode selection, and the like.

The housing 14 comprises an operating part 50. The user performs various operations related to imaging through the operating part 50. For example, as illustrated in FIGS. 1 and 2, the operating part 50 includes a release button 310, a zoom lever 320, operation dials 330 and 340, and a cross button 350 arranged on an outer surface of the housing 14. In a case where these devices are operated by the user, the devices transmit various control signals toward the processing portion 30. For example, in a case where the zoom lever 320 is operated, a control signal for changing a zoom magnification is transmitted toward the processing portion 30 in accordance with the operation. The processing portion 30 controls the lens drive portion 120 to be driven in order to move the zoom lens 112 in accordance with the control signal.

In addition, in the first embodiment, the display 40 is a touch panel display and doubles as the operating part 50. In a case where the user touches a screen of the display 40, a control signal corresponding to the touched position is transmitted toward the processing portion 30. For example, in a case where a mode selection screen (refer to FIG. 9) described later is displayed on the display 40, and the user touches one corresponding button of a plurality of mode selection buttons drawn on the screen, a control signal for setting a selected mode is transmitted toward the processing portion 30. In addition, the user can instruct the processing portion 30 to execute zooming processing or shutter processing (imaging processing) through an operation of touching a predetermined location on the screen of the display 40.

Figure 4:
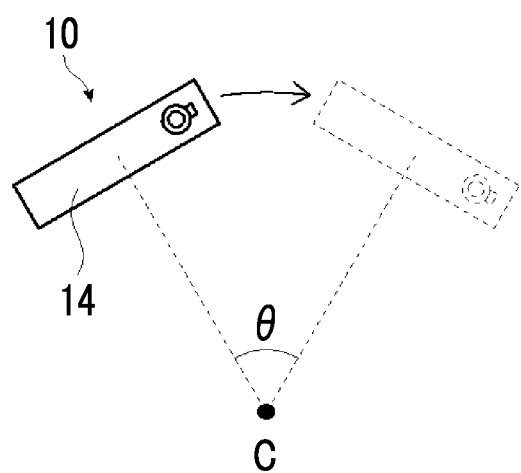
FIG. 4 is a descriptive diagram for a motion of the imaging apparatus.

In the first embodiment, a detector 60 is attached to the housing 14. The detector 60 detects a motion of the imaging apparatus 10 including the housing 14 and specifically, detects movement of the housing 14 in a horizontal direction. As illustrated in FIG. 4, movement of the housing 14 in the horizontal direction is a motion of the housing 14 in a case where the user moves (in a strict sense, rotationally moves) the imaging apparatus 10 about a vertical axis C as a center such that a direction of a front surface of the imaging apparatus 10 changes in order to change the angle of view of imaging. FIG. 4 is a diagram of the imaging apparatus 10 viewed from above.

For example, the detector 60 according to the first embodiment is configured with a gyro sensor attached to the housing 14, measures an angular velocity, a rotation amount (in FIG. 4, denoted by reference numeral $\theta$), and a movement direction in a case where the housing 14 moves in the horizontal direction, and detects the motion of the housing 14 based on the measurement result. The detector 60 is not limited to only the gyro sensor and may be configured with a motion sensor other than the gyro sensor, for example, an acceleration sensor. In addition, the motion of the housing 14 may be detected by determining whether or not the angle of view is changed by analyzing the reference video using an image processing apparatus as the detector 60.

<<Extraction Video>>

Next, the extraction video will be described in detail with reference to FIGS. 5 to 8.

Figure 5:
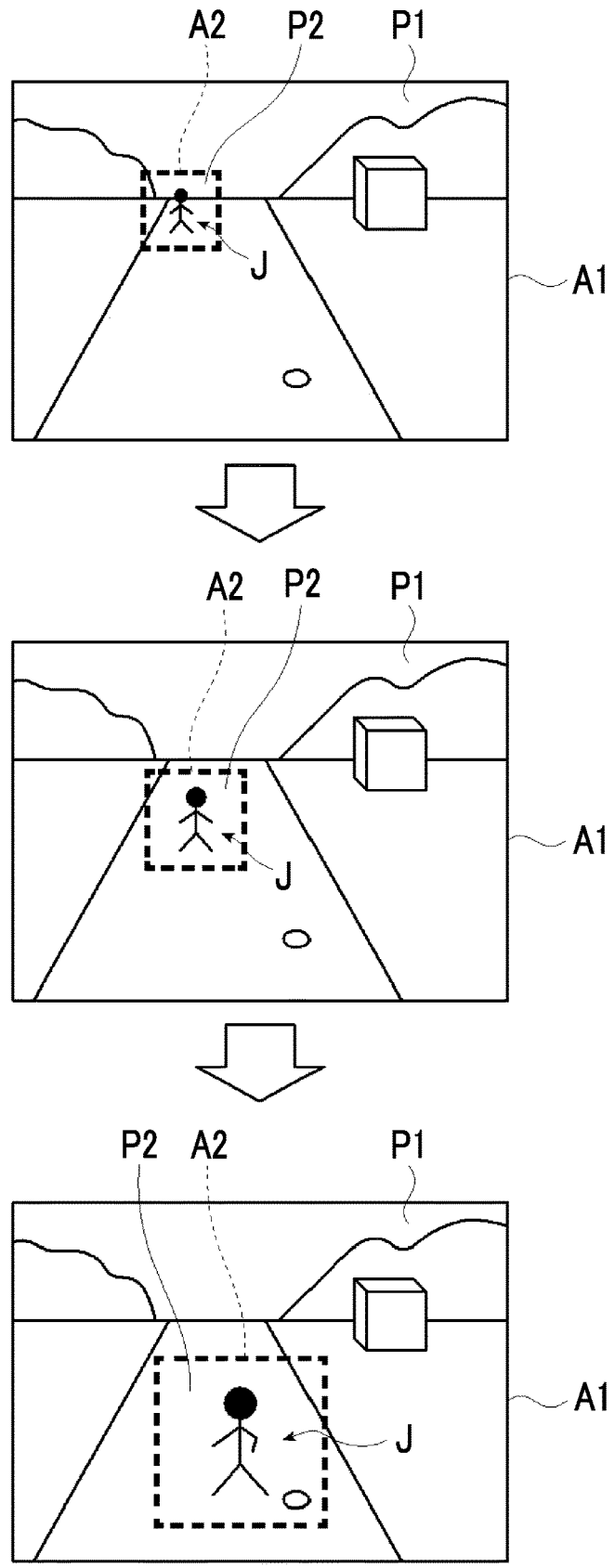
FIG. 5 is a diagram illustrating a state of movement of an extraction range in a case where a subject of a tracking target is present.

States illustrated in each of FIGS. 5, 6, and 8 transition in order of a state in an upper part, a state in a middle part, and a state in a lower part. In addition, in the drawings from FIG. 5, the angle of view at a time of capturing the reference video is designated by reference numeral A1. The extraction range is designated by reference numeral A2. The reference video is designated by reference numeral P1. The extraction video is designated by reference numeral P2.

The extraction video is a video set to be smaller than the angle of view and is extracted from the reference video and displayed on the display 40. In the first embodiment, the reference video is a high image quality video consisting of 10 million or more (preferably, 60 million or more) pixels. Thus, the extraction video extracted from the reference video is also a video having sufficiently high image quality. In the first embodiment, as illustrated in FIGS. 6 and 8, outer edges of the extraction video have an oblong shape. However, the shape of the outer edges is not particularly limited and may be a square shape, a parallelogramic shape, a trapezoidal shape, a rhombic shape, a circular shape or an elliptical shape, a triangular shape or a polygonal shape of a pentagonal or higher-faceted shape, or an indefinite shape.

A position, a size, a width-to-height ratio (aspect ratio), and the like of the extraction range are initially set. Normally, a predetermined range within the angle of view is set as the extraction range. The position, the size, the width-to-height ratio, and the like of the extraction range may be set and changed on the user side. For example, a setting screen not illustrated may be displayed on the display 40, and the user may set and change the position, the size, the width-to-height ratio, and the like of the extraction range through the setting screen.

In the first embodiment, in a case where a predetermined condition is satisfied during imaging, the processing portion 30 moves the extraction range within the angle of view over time. Here, "moving over time" means moving the extraction range relative to the angle of view such that the position of the extraction range gradually changes, and may include a case where movement is stopped (paused) in the middle of imaging.

By moving the extraction range over time during imaging, for example, the subject captured within the extraction range can be set as a tracking target, and the subject can be tracked within the angle of view as illustrated in FIG. 5. That is, by using a function of the processing portion 30, the extraction range can be automatically moved in connection with movement of the subject within the angle of view such that the subject falls within the extraction range.

In addition, in a case where the subject of the tracking target moves in a depth direction (that is, a direction of approaching to and separating from the imaging apparatus 10), a size of a video of the subject changes as illustrated in FIG. 5. That is, a ratio (hereinafter, referred to as a subject video ratio) of the size of the video of the subject to the size of the extraction range changes. Thus, in the first embodiment, as illustrated in FIG. 5, the size of the extraction range is changed in accordance with movement of the subject in the depth direction, that is, a change in subject video ratio. Specifically, the size of the extraction range is adjusted such that the subject video ratio is approximately constantly maintained. This size adjustment corresponds to electronic zooming processing described later.

According to the above description, as long as the subject of the tracking target is present within the angle of view, the extraction video including the subject of the tracking target can be displayed on the display 40 at all times as illustrated in FIG. 6. In addition, in the displayed extraction video, the size of the subject of the tracking target is approximately constantly maintained. In addition, the user does not need to move the imaging apparatus 10 in order to track the subject of the tracking target. Thus, the angle of view is not manually changed, and distortion (blurred video or the like) of the video occurring at a time of manually changing the angle of view can be avoided. Such an effect is particularly effective in a case where the angle of view is relatively increased by using an anamorphic lens or the like.

Figure 7:
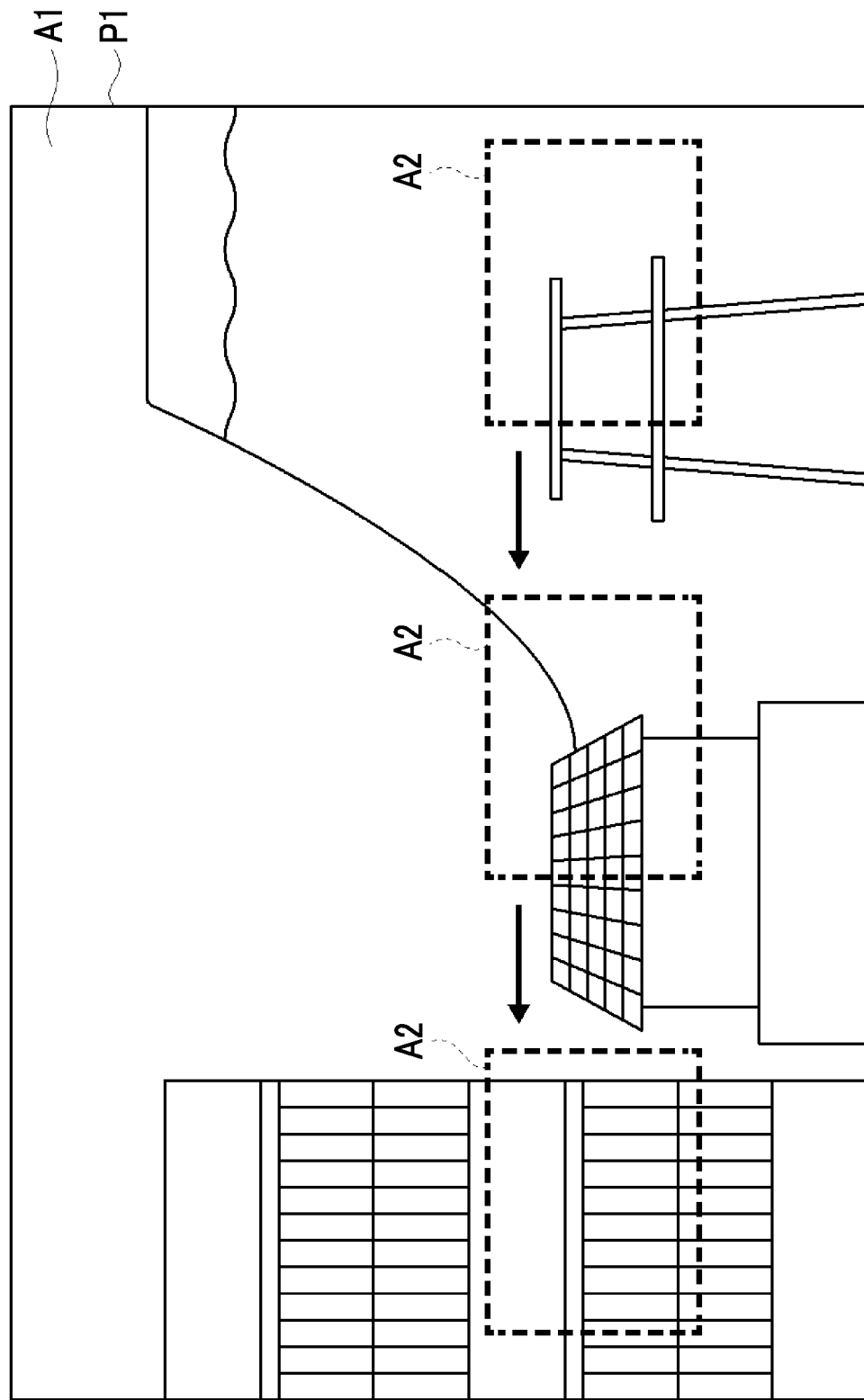
FIG. 7 is a diagram illustrating a state of movement of the extraction range in a case where the subject of the tracking target is not present.

Meanwhile, in a case where the subject captured within the extraction range is not the tracking target (for example, in a case where a still object such as a landscape is the subject), the extraction range automatically slides (pans) from one end to the other end of the angle of view in the lateral direction as illustrated in FIG. 7. Accordingly, a video of which an imaging angle is continuously changed in the horizontal direction as illustrated in FIG. 8, that is, a panoramic motion picture, can be displayed on the display 40. In addition, the user does not need to move the imaging apparatus 10 in order to change the imaging angle. Thus, the angle of view is not manually changed, and distortion (blurred video or the like) of the video occurring at a time of manually changing the angle of view can be avoided. Such an effect is particularly effective in a case where the angle of view is relatively increased by using an anamorphic lens or the like.

A movement speed of the extraction range may be set in advance or may be able to be changed to any speed by causing the user to perform, for example, a button operation during movement of the extraction range. In addition, a time period from when movement of the extraction range starts to when an end of the extraction range reaches an end of the angle of view, that is, a required time period for movement, may be obtained. In this case, a remaining movement time period tr based on a difference between the obtained required time period and an elapsed time period from the start of movement may be displayed on the display 40 as illustrated in FIG. 8.

In addition, automatic movement (panning) of the extraction range based on the function of the processing portion 30 and a movement operation (operation for changing the angle of view) of the imaging apparatus 10 performed by the user may be performed at the same time.

As described above, a movement mode of the extraction range includes a first mode (hereinafter, referred to as a tracking mode) in which the extraction range is moved to track the subject of the tracking target, and a second mode (hereinafter, referred to as a panning mode) in which the extraction range is moved in a certain direction. For example, the user can select any one mode on the mode selection screen illustrated in FIG. 9, and the processing portion 30 moves the extraction range within the angle of view in accordance with the mode selected by the user.

Figure 9:
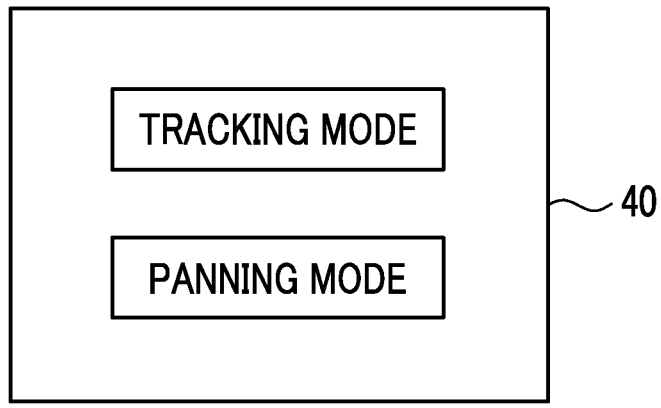
FIG. 9 is a diagram illustrating an example of a selection screen for a movement mode of the extraction range.

The movement mode of the extraction range may be designated based on an intention of the user, specifically, a selection result on the mode selection screen illustrated in FIG. 9.

Alternatively, the imaging apparatus 10 may automatically determine whether or not the tracking target is present by analyzing the reference video, and automatically designate the movement mode based on the determination result. In this case, for example, the tracking mode is selected in a case where the subject of the tracking target is present, and the panning mode is selected in a case where the subject of the tracking target is not present.

Alternatively, in a case where the user moves the imaging apparatus 10, the detector 60 may detect a movement speed (specifically, an angular velocity) or the like and automatically designate the movement mode based on the detection result. In this case, for example, the tracking mode is selected in a case where the movement speed is random, and the panning mode is selected in a case where the movement speed is constant.

<<Processing Performed by Processing Portion>>

Next, processing of the processing portion 30 will be described. Processing of the processing portion 30 is broadly divided into processing executed by the control processing portion 210 and processing executed by the video processing portion 220. For example, examples of the former processing include imaging processing, autofocus processing, optical zooming processing, and optical camera shake correction. Examples of the latter processing include electronic zooming processing, electronic camera shake correction processing, setting processing, extraction processing, determination processing, movement processing, recording processing, and alert processing. Hereinafter, a summary of each processing will be described.

[Imaging Processing]

The imaging processing is processing in which the processing portion 30 captures a video within the angle of view of the imaging portion 20, that is, the reference video, by controlling the imaging portion 20. For example, in a case where the imaging apparatus 10 is started, the imaging processing is automatically started along with the start of the imaging apparatus 10.

[Autofocus Processing]

The autofocus processing is processing in which the processing portion 30 controls the lens drive portion 120 such that the focus lens 114 of the lens unit 110 moves along the optical axis. For example, the autofocus processing is executed in a timely manner during movement of the extraction range. Accordingly, the subject within the moving extraction range can be focused.

[Optical Zooming Processing]

The optical zooming processing is an example of the zooming processing and is processing of performing optical zooming on the video of the subject within the extraction video. Specifically, in a case where the user operates the zoom lever 320 as a zoom operation part, the optical zooming processing is executed, and the processing portion 30 moves the zoom lens 112 along the optical axis by controlling the lens drive portion 120. Other examples of the zoom operation part include a rotation ring for a zoom operation in the lens unit 110. The optical zooming processing is used together with the electronic zooming processing. For example, in a case where image quality of the extraction video deteriorates (becomes coarse) by frequently executing the electronic zooming processing during imaging, the optical zooming processing is appropriately executed in order to improve the image quality.

[Optical Camera Shake Correction]

The optical camera shake correction processing is an example of camera shake correction processing and is processing for stabilizing the extraction video by suppressing an effect of vibration or the like applied to the imaging apparatus 10 during imaging. Specifically, the processing portion 30 shifts the optical axis by controlling the lens drive portion 120 to move the lens unit 110. The optical camera shake correction is implemented using a well-known technology. For example, a technology for optical camera shake correction disclosed in JP5521518B can be used.

[Electronic Zooming Processing]

The electronic zooming processing is an example of the zooming processing and is processing of performing electronic zooming (digital zooming) on the video of the subject within the extraction video. Specifically, the processing portion 30 changes the size of the extraction range (in other words, the number of pixels of the extraction video) within the angle of view. For example, the electronic zooming processing is executed in a timely manner during movement of the extraction range. For example, in a case where the subject within the extraction range moves in the depth direction of the imaging apparatus 10, and the size of the video of the subject of the tracking target changes, the electronic zooming processing is executed in order to adjust the subject video ratio.

In the electronic zooming processing, the size of the extraction range is changed in accordance with a distance between the imaging apparatus 10 and the subject within the extraction video. The distance between the imaging apparatus 10 and the subject within the extraction video can be measured using a distance measurement technology with which a general digital camera is equipped. For example, a distance measurement method based on a phase difference method using a phase difference pixel, or a method of measuring a distance to the subject based on a flight time period of light using a time of flight (TOF) method can be used.

In addition, according to the electronic zooming processing, the size (display size) of the subject of the tracking target can be constantly maintained during movement of the extraction range by analyzing the extraction video.

[Electronic Camera Shake Correction Processing]

The electronic camera shake correction processing is an example of the camera shake correction processing and is processing in which the processing portion 30 shifts the position of the extraction range in order to stabilize the extraction video by suppressing the effect of vibration or the like applied to the imaging apparatus 10 during imaging. Electronic camera shake correction is implemented using a well-known technology, for example, a technology for electronic camera shake correction (electric image stabilization; EIS) disclosed in JP5521518B, WO2016/181717A, or the like. In executing the electronic camera shake correction processing, an immediately previous frame image among frame images constituting the reference video is stored in the buffer 250 during imaging. In a stage in which a new frame image is captured, the processing portion 30 obtains an amount of shift in image within the extraction range by comparing the frame image with the immediately previous frame image stored in the buffer 250. In a case where the obtained amount of shift exceeds a threshold value, the electronic camera shake correction processing is executed.

[Setting Processing]

The setting processing is processing in which the processing portion 30 sets the extraction range within the angle of view in the reference video. Normally, the setting processing is executed in a case where the imaging apparatus 10 is started. At this point, in the setting processing, the position, the size, the width-to-height ratio (aspect ratio), and the like of the extraction range are set to initial values. However, the present invention is not limited thereto. The user may set the position, the size, the width-to-height ratio, and the like of the extraction range through the operating part 50 and appropriately change the position, the size, the width-to-height ratio, and the like of the extraction range after setting.

In addition, in a case where the tracking mode is selected, the extraction range is set based on the subject of the tracking target. For example, the user moves the imaging apparatus 10 such that one subject present within the angle of view is displayed on the display 40 for a certain time period or longer. Specifically, the user changes the angle of view or performs zooming. In this case, the processing portion 30 recognizes the subject as the subject of the tracking target and sets the extraction range into which the subject falls. A procedure other than the above procedure may be used as a procedure of setting the extraction range based on the subject. For example, the entire screen of the reference video may be displayed on the display 40, and the user may set the extraction range into which the subject falls, by touching the subject captured in the reference video.

[Extraction Processing]

The extraction processing is processing in which the processing portion 30 extracts (that is, cutting out) the extraction video captured within the extraction range from the reference video. For example, in a case where the tracking mode is selected, a video of a certain range including the video of the subject of the tracking target is extracted as the extraction video. In addition, in a case where the panning mode is selected, the extraction video is extracted such that the subject sequentially changes (slides). The extraction video is displayed on the display 40 as illustrated in FIGS. 6 and 8, and the user can check the extraction video through the display 40.

[Determination Processing]

The determination processing is processing in which the processing portion 30 determines whether or not the end of the extraction range reaches the end of the angle of view by the motion of the housing 14 in a case where the detector 60 has detected the motion. In the first embodiment, the determination processing is executed in a case where the detector 60 has detected movement of the housing 14 in the horizontal direction as the motion of the housing 14 in a state where the panning mode is selected.

Figure 10:
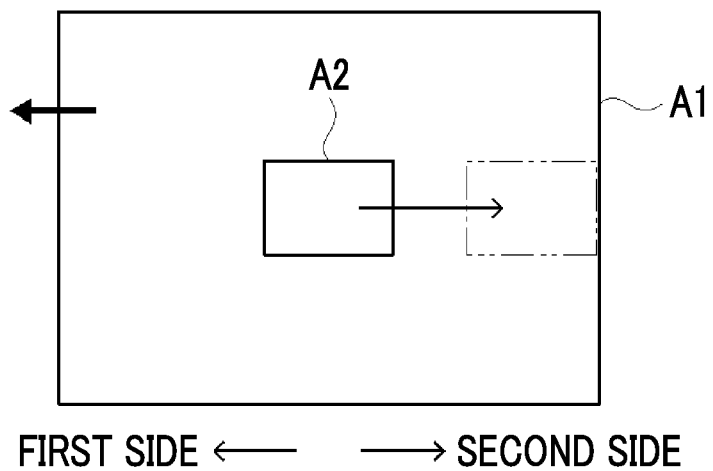
FIG. 10 is a descriptive diagram for determination processing.

The determination processing will be specifically described with reference to FIG. 10. In the determination processing, in a case where the user moves the imaging apparatus 10 in the horizontal direction (in FIG. 10, a direction indicated by a bold arrow), the detector 60 detects the movement of the housing 14 at the time of movement. At this point, a side to which the imaging apparatus 10 heads at a time of movement in the horizontal direction will be referred to as a first side, and the opposite side will be referred to as a second side. In the case illustrated in FIG. 10, a left side corresponds to the first side, and a right side corresponds to the second side.

In a case where the detector 60 has detected movement of the housing 14 to the first side of the horizontal direction, the processing portion 30 shifts the extraction range to the second side of the horizontal direction by an amount corresponding to a movement amount of the housing 14 using the electronic camera shake correction processing (EIS). Accordingly, as illustrated in FIG. 10, the extraction range moves to the second side relative to the angle of view. The processing portion 30 executes the determination processing and determines whether or not the end of the extraction range positioned on the second side reaches the end of the angle of view positioned on the second side by the relative movement. A determination result of the determination processing is reflected on whether or not to execute the movement processing.

[Movement Processing]

The movement processing is executed during imaging and is processing in which the processing portion 30 moves the extraction range within the angle of view over time. In the first embodiment, in a case where the motion of the housing 14 is detected by the detector 60, the movement processing is executed in accordance with the detected motion. A relationship between the motion of the housing 14 detected by the detector 60 and execution of the movement processing will be described in detail in a later section.

In addition, during execution of the movement processing, the processing portion 30 displays the extraction video during movement of the extraction range on the display 40. During execution of the movement processing, in a case where the housing 14 moves (vibrates) due to, for example, transmission of vibration to the imaging apparatus 10 from the user or a ground, the electronic camera shake correction processing or the optical camera shake correction processing is executed on the extraction video during movement of the extraction range. Accordingly, blurriness of the extraction video displayed on the display 40 is reduced, and the displayed video is stabilized.

A method of moving the extraction range in the movement processing varies depending on the selected mode out of the tracking mode and the panning mode. In a case where the tracking mode is selected, the processing portion 30 sets the subject captured within the extraction range as the tracking target. In the movement processing, the processing portion 30 moves the extraction range such that the subject of the tracking target enters within the extraction range (in a strict sense, falls within the extraction range). In such a manner, in the movement processing in a case where the tracking mode is selected, the subject of the tracking target is searched for within the angle of view, and the extraction range is moved in connection with movement of the subject of the tracking target.

An algorithm for searching for the subject of the tracking target within the angle of view is not particularly limited. As an example of the algorithm, an image of the subject set as the tracking target may be stored in the buffer 250 as a template image, and a video of a part matching with the template image may be specified by comparing the template image with the reference video by applying a well-known template matching technology.

In addition, in the movement processing in a case where the tracking mode is selected, it is preferable that the movement speed of the extraction range is set to a speed corresponding to a movement speed of the subject so that the subject of the tracking target can be tracked. In a case where the angle of view is divided in units of pixels, the movement speed of the extraction range is the number of pixels through which the moving extraction range passes within a unit time period.

Meanwhile, in the movement processing in a case where the panning mode is selected, the extraction range is moved from one end to the other end of the angle of view in the lateral direction. At this point, the movement speed of the extraction range may be a constant speed or, for example, may be a speed corresponding to a movement speed (specifically, an angular velocity) of movement of the housing 14 in the horizontal direction detected by the detector 60. In the movement processing in a case where the panning mode is selected, the user may be able to change the movement speed of the extraction range by, for example, operating the operating part 50 during execution of the movement processing (that is, during movement of the extraction range).

As additional description to the movement speed of the extraction range, in a case where the electronic zooming processing or the optical zooming processing is executed during execution of the movement processing, the size of the extraction range (that is, the number of pixels of the extraction video) changes. Thus, in a case where the movement speed of the extraction range is the same before and after the zooming processing, the movement speed of the extraction range looks rapidly changing for the user viewing the extraction video through the display 40. Therefore, in the first embodiment, in a case where any of the zooming processing is executed during execution of the movement processing, the processing portion 30 adjusts the movement speed of the extraction range in accordance with the zooming (specifically, the zoom magnification after change) in the movement processing. Specifically, the processing portion 30 decreases the movement speed in a case of zooming up and increases the movement speed in a case of zooming out. Accordingly, an awkward look of the extraction video can be solved.

Returning to description of the movement processing, the processing portion 30 finishes the movement processing in a case where any of finish conditions (J1) to (J5) below is established.

(J1) In a case where the user issues an instruction to finish the movement processing through the operating part 50 during execution of the movement processing.

(J2) In a case where the user moves the housing 14 in a direction opposite to a movement direction of the extraction range during execution of the movement processing, and the detector 60 detects the motion.

(J3) In a case where the tracking mode is selected, and the subject of the tracking target deviates from the angle of view during execution of the movement processing.

(J4) In a case where the tracking mode is selected, and the subject of the tracking target stops (stands still) for a certain time period or longer during execution of the movement processing.

(J5) In a case where the panning mode is selected, and the end of the extraction range reaches the end of the angle of view during execution of the movement processing.

A finish condition of the movement processing is not limited to the five conditions. Conditions other than the five conditions may be further included, and one to four of the five conditions may not be included.

[Recording Processing]

The recording processing is processing in which the processing portion 30 records the extraction video on the recording medium including the internal memory 230, the memory card 240, and the like. For example, the recording processing is started at a point in time when the release button 310 is pushed once, and is finished at a point in time when the release button 310 is pushed again. In the first embodiment, in a case where the movement processing is executed, the processing portion 30 records the extraction video during movement of the extraction range in the movement processing on the recording medium in the recording processing. In addition, in a case where at least one of the optical zooming processing, the electronic zooming processing, the optical camera shake correction processing, or the electronic camera shake correction processing is executed during execution of the movement processing, the extraction video after the processing is performed is recorded in the recording processing. In the first embodiment, in a case where the movement processing is finished, the recording processing is finished in connection with the finish of the movement processing.

In the first embodiment, only the extraction video is recorded on the recording medium in the recording processing, and other videos (specifically, the reference video) are not recorded and are discarded. Accordingly, a used capacity of the recording medium can be reduced by an amount obtained by not recording the reference video. However, the present invention is not limited thereto. Both of the extraction video and the reference video may be recorded on the recording medium.

[Alert Processing]

Figure 11:
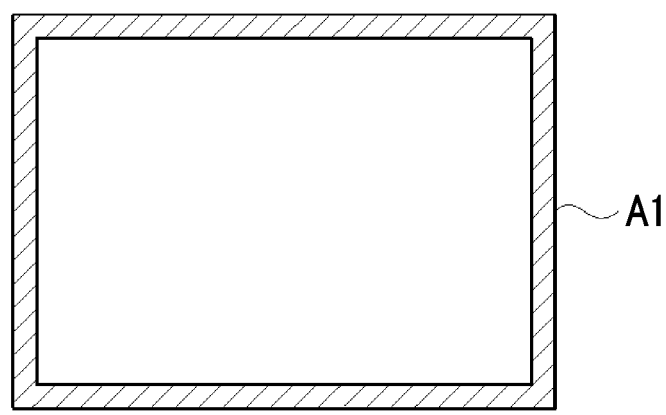
FIG. 11 is a descriptive diagram for an angle-of-view end nearby area.

The alert processing is processing in which the processing portion 30 issues an alert toward the user in a case where a predetermined situation is reached during execution of the movement processing. For example, in executing the movement processing in the tracking mode, in a case where the moving extraction range approaches an angle-of-view end nearby area within the angle of view, the alert processing is performed in order to notify the user of the approach. As illustrated in FIG. 11, the angle-of-view end nearby area corresponds to a range from a position separated from the end of the angle of view by a predetermined distance to the end in the angle of view, and is a range with hatching in FIG. 11.

An alert method in the alert processing is not particularly limited. For example, examples of the alert method include displaying an alert message or changing an outer edge frame of the extraction video to a predetermined color (specifically, red or the like).

<<Flow of Movement Processing>>

In the first embodiment, the video is captured using an imaging method according to the embodiment of the present invention. In a case where the detector 60 has detected the motion of the housing 14 during imaging, the processing portion 30 executes the movement processing in accordance with the detected motion of the housing 14. Specifically, in the first embodiment, in a case where the user moves the imaging apparatus 10 for the purpose of, for example, changing the angle of view, the detector 60 detects the motion of the housing 14 at the time of movement, and the processing portion 30 executes the movement processing based on the detection as a trigger.

In the movement processing, the extraction range moves to track the subject or automatically toward the end of the angle of view. Accordingly, after the detector 60 detects the motion of the housing 14, the user does not need to move the imaging apparatus 10 again in order to change the angle of view. Consequently, the user can concentrate on imaging. That is, recording of the extraction video while moving the extraction range is further facilitated for the user.

A flow of various processing including the movement processing varies depending on the selected mode out of the tracking mode and the panning mode. Hereinafter, the flow of processing will be described for each mode.

(Flow of Processing in Case Where Tracking Mode Is Selected)

Figure 12:
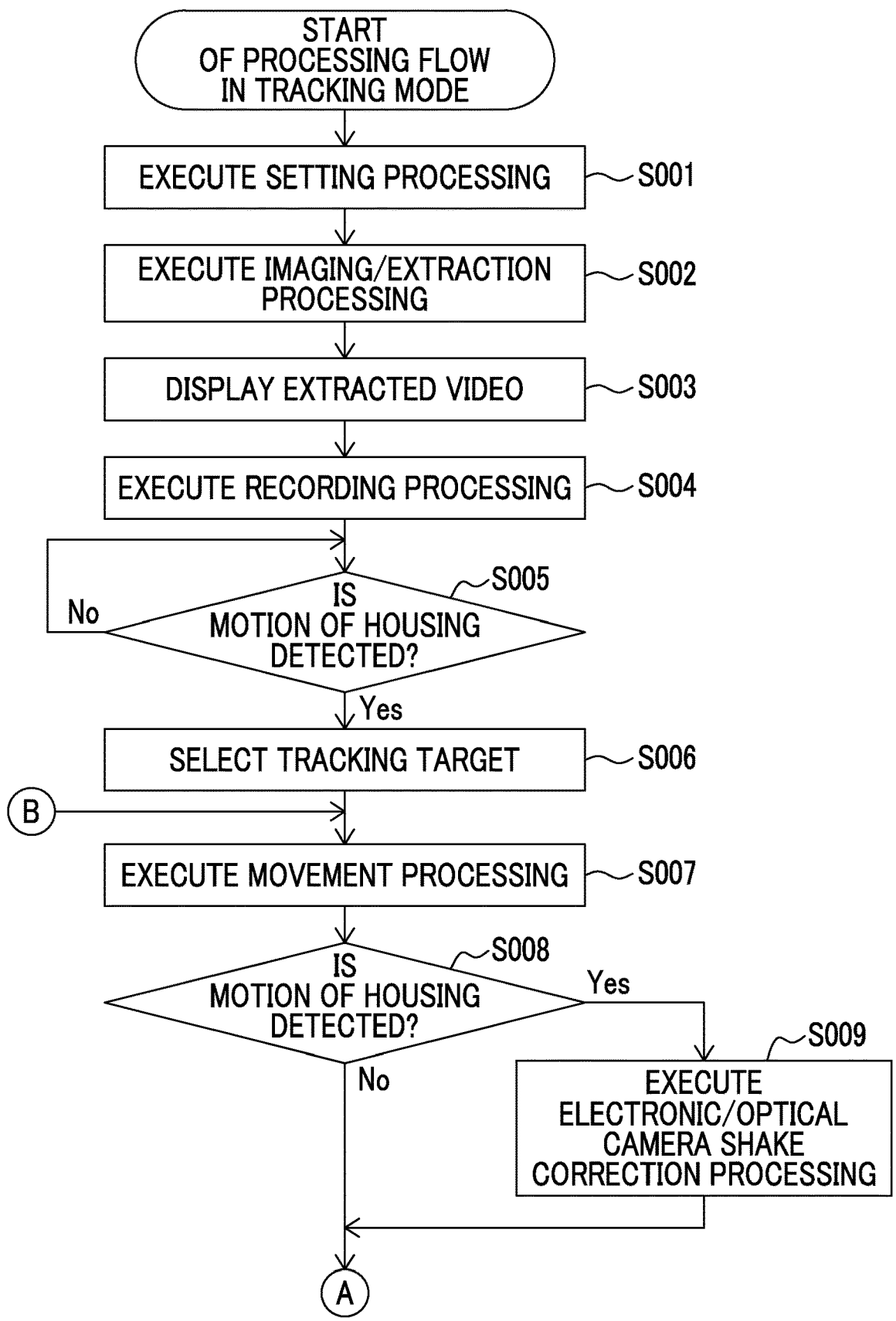
FIG. 12 is a diagram illustrating a processing flow in a case where a tracking mode is selected (Part 1).
Figure 13:
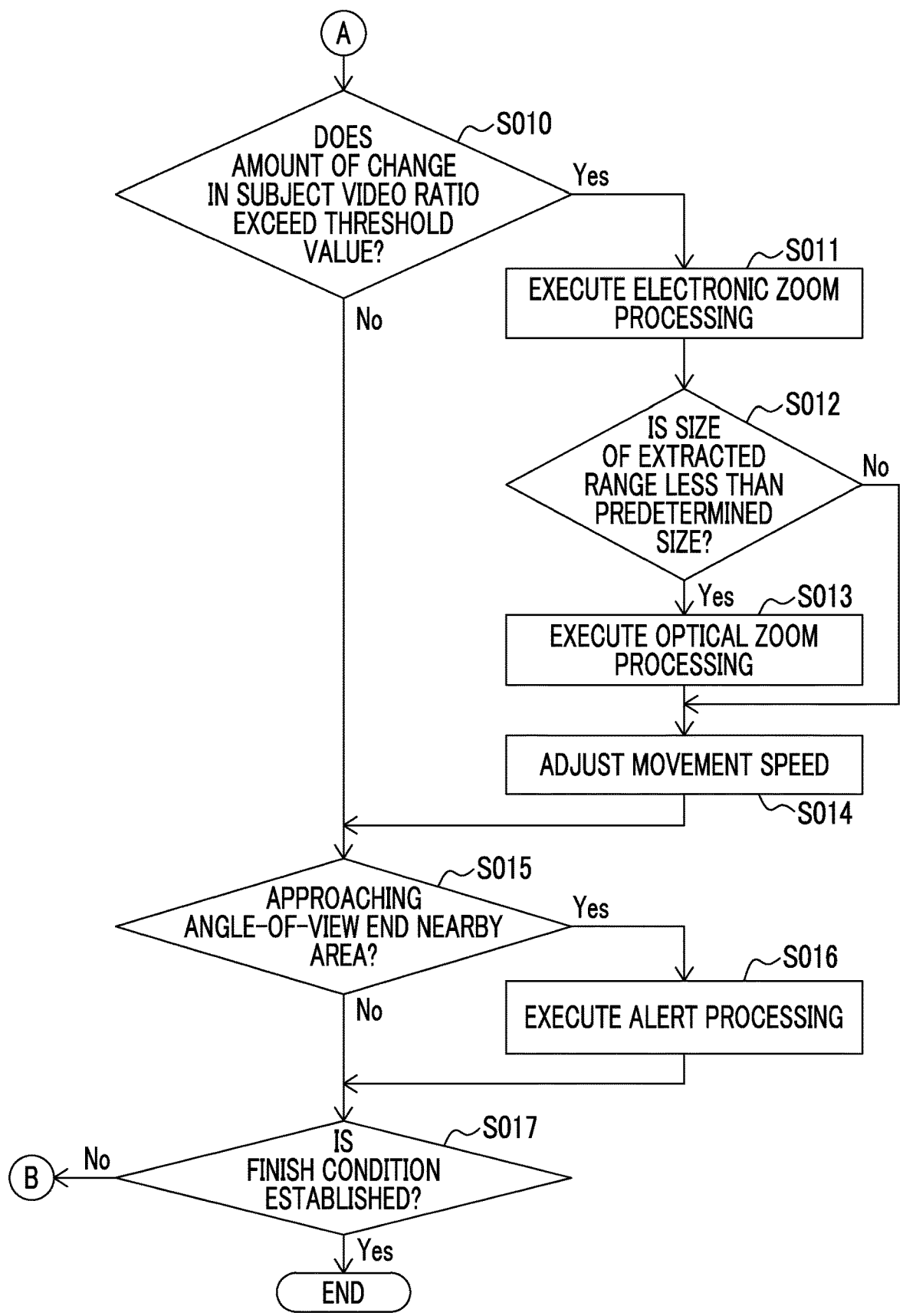
FIG. 13 is a diagram illustrating the processing flow in a case where the tracking mode is selected (Part 2).

The flow of processing in a case where the tracking mode is selected will be described with reference to FIGS. 12 to 14.

In executing the movement processing, the user first starts the imaging apparatus 10. After the start of the apparatus, the processing portion 30 executes the setting processing (S001) and sets the extraction range within the angle of view in accordance with the initial values or input values and the like of the user. Step S001 corresponds to a setting step.

Then, capturing of the reference video is started within the angle of view of the imaging apparatus 10, and the processing portion 30 extracts the extraction video from the reference video by executing the extraction processing (S002). Step S002 corresponds to an extraction step. In addition, the extraction video is displayed on the display 40 by executing the extraction step (S003).

The user pushes the release button 310 in order to start recording the extraction video. Accordingly, the processing portion 30 executes the recording processing and starts recording the extraction video (S004). In other words, a recording step is started by pushing the release button 310.

Furthermore, in a case where the tracking mode is selected, the user moves the imaging apparatus 10 in order to track a certain subject. For example, in a case where a subject J illustrated in FIG. 14 moves, the user moves the imaging apparatus 10 such that the subject J continuously enters within the extraction range as illustrated in the drawing. The detector 60 detects the motion of the housing 14 at the time of movement (S005). An upper part of FIG. 14 illustrates the angle of view immediately before the imaging apparatus 10 is moved, and a lower part of FIG. 14 illustrates the angle of view immediately after the imaging apparatus 10 is moved.

In a case where the detector 60 detects the motion of the housing 14, the processing portion 30 compares the extraction videos before and after detection of the motion by the detector 60 and selects the subject J captured within both of the extraction videos in common as the tracking target (S006). At this point, the processing portion 30 can recognize the subject J captured in the extraction videos before and after detection of the motion by the detector 60, using the template matching technology or the like. A method of selecting the tracking target is not limited to the above method. The user may designate the subject by, for example, touching the video of the subject on the display 40, and the tracking target may be selected based on the designation operation. Alternatively, the extraction videos before and after detection of the motion by the detector 60 may be compared, and a subject having the smallest movement amount among subjects captured in each extraction video may be selected as the tracking target.

Then, the processing portion 30 executes the movement processing and moves the extraction range within the angle of view such that the subject J enters within the extraction range as illustrated in FIG. 5 (S007). Step S007 corresponds to a movement step. In the movement step, the processing portion 30 may move the extraction range at a movement speed set in advance or may move the extraction range at a movement speed (for example, the same speed as the subject J) corresponding to a speed of the subject J calculated by analyzing the extraction video.

In the movement processing, the processing portion 30 moves the extraction range and displays the extraction video during movement of the extraction range on the display 40 (refer to FIG. 6). In addition, in the recording processing executed at the same time as the movement processing, the processing portion 30 records the extraction video during movement of the extraction range in the movement processing on the recording medium. That is, the recording step of recording the extraction video during movement of the extraction range in the movement step is executed.

In addition, in a case where the detector 60 detects the motion (specifically, a motion caused by transmission of vibration or the like) of the housing 14 during execution of the movement processing (S008), the processing portion 30 executes the electronic camera shake correction processing or the optical camera shake correction processing (S009). In step S009, camera shake correction is performed on the extraction video during movement of the extraction range. Accordingly, the extraction video that changes along with movement of the extraction range can be stabilized, and the extraction video can be smoothly changed even in a case where a camera shake or the like occurs.

In addition, in a case where a ratio (that is, the subject video ratio) of a size of a video of the subject J to the size of the extraction range changes due to movement of the subject J in the depth direction, the amount of change may exceed a threshold value (S010). In this case, the processing portion 30 executes the electronic zooming processing and changes the size of the extraction range in accordance with a distance between the imaging apparatus 10 and the subject J (S011). In such a manner, the processing portion 30 moves the extraction range while changing the size of the extraction range based on a change in subject video ratio in the movement processing. Accordingly, for example, it is possible to move the extraction range while maintaining the subject video ratio. Consequently, while the subject J is tracked, the video of the subject J can be displayed on the display 40 in an approximately constant size as illustrated in FIG. 6.

In a case where execution of the electronic zooming processing (particularly, execution of the zooming up) causes the size of the extraction range to be less than a predetermined size or causes the number of pixels included in the extraction range to be less than a predetermined number (S012), the image quality of the extraction video becomes coarse. Thus, the processing portion 30 executes the optical zooming processing and performs the optical zooming on the video of the subject within the extraction video (S013). Accordingly, the image quality of the extraction video decreased by execution of the electronic zooming processing can be recovered. In step S013, a notification that prompts the user to perform the optical zooming processing may be displayed on the display 40.

In addition, in a case where the electronic zooming processing or the optical zooming processing is executed during execution of the movement processing, the processing portion 30 adjusts the movement speed of the extraction range in accordance with the electronic zooming or the optical zooming (S014). In the movement processing after S014, the processing portion 30 moves the extraction range at the adjusted movement speed, that is, a movement speed corresponding to the electronic zooming or the optical zooming. Accordingly, inconvenience (specifically, a situation in which the movement speed of the extraction range looks rapidly changing for the user viewing the extraction video through the display 40) accompanied by execution of the zooming processing can be avoided.

In addition, in the movement processing, the processing portion 30 determines whether or not the moving extraction range approaches the angle-of-view end nearby area within the angle of view (S015). In a case where the extraction range approaches the angle-of-view end nearby area, the processing portion 30 executes the alert processing (S016). Accordingly, the user can be prompted to perform an operation for changing the angle of view, an operation for issuing an instruction to finish imaging, or the like by notifying the user that the extraction range approaches near the end of the angle of view.

In the processing described so far, steps S007 to S016 are repeatedly executed during the movement processing. The processing portion 30 finishes the movement processing at a point in time when any of the finish conditions (J1) to (J4) is established during execution of the movement processing (S017). At this point, the recording processing may be finished in accordance with the finish of the movement processing, or the recording processing may continue after the finish of the movement processing.

After the finish of the movement processing, in a case where the user moves the imaging apparatus 10 again to follow the subject J, and the detector 60 detects the motion of the housing 14 at the time of movement, the movement processing is executed again, and the series of processing (S006 to S017) is repeated.

(Flow of Processing in Case Where Panning Mode Is Selected)

The flow of processing in a case where the panning mode is selected will be described with reference to FIGS. 15 and 16.

In a case where the panning mode is selected, a procedure (S021 to S024) from the start of the imaging apparatus 10 until execution of the recording processing by pushing the release button 310 by the user is the same as in a case where the tracking mode is selected. That is, even in a case where the panning mode is selected, the setting step and the extraction step are executed, and the recording step is started by pushing the release button 310.

In a case where the panning mode is selected, the user moves the imaging apparatus 10 to the first side of the horizontal direction. The detector 60 detects the motion of the housing 14 at the time of movement, that is, movement to the first side of the horizontal direction (S025). In a case where the detector 60 detects movement of the housing 14, the processing portion 30 shifts the extraction range to the second side of the horizontal direction by an amount corresponding to the movement amount of the housing 14 using the EIS (S026).

Then, the processing portion 30 executes the determination processing and determines whether or not the end of the extraction range on the second side reaches the end of the angle of view on the second side (S027). In a case where a determination that the end of the extraction range on the second side reaches the end of the angle of view on the second side is made in the determination processing, the processing portion 30 executes the movement processing and moves the extraction range toward the first side in the horizontal direction as illustrated in FIG. 7 (S028). Step S028 corresponds to the movement step.

In the first embodiment, the processing portion 30 sets the movement speed of the extraction range in executing the movement processing and moves the extraction range at the set movement speed in the movement processing. The movement speed of the extraction range is set in accordance with a horizontal movement time period tx. The horizontal movement time period tx is a time period from when horizontal movement of the housing 14 detected by the detector 60 starts to when the end of the extraction range on the second side reaches the end of the angle of view on the second side. For example, the horizontal movement time period tx can be calculated from an angular velocity in horizontal movement of the housing 14 detected by the detector 60, or a movement speed in a case where the end of the extraction range on the second side moves toward the end of the angle of view on the second side. The speed of the extraction range during execution of the movement processing may be constant or may be changed. For example, the user may change the speed of the extraction range to any speed by operating the operating part 50.

In the movement processing, the processing portion 30 moves the extraction range and displays the extraction video during movement of the extraction range on the display 40 (refer to FIG. 8). At this point, the processing portion 30 may obtain a time period (that is, the required time period for movement) from when the movement starts to when the end of the extraction range reaches the end of the angle of view, from the movement speed of the extraction range. Furthermore, the processing portion 30 may display the remaining movement time period tr based on the difference between the obtained required time period and the elapsed time period from the start of movement on the display 40. In addition, in the recording processing executed at the same time as the movement processing, the processing portion 30 records the extraction video during movement of the extraction range in the movement processing on the recording medium. That is, the recording step of recording the extraction video during movement of the extraction range in the movement step is executed.

In addition, in the panning mode, in a case where the detector 60 detects the motion (specifically, a vibration or the like) of the housing 14 during execution of the movement processing (S029), the processing portion 30 executes the electronic camera shake correction processing or the optical camera shake correction processing (S030). In step S030, the camera shake correction is performed on the extraction video during movement of the extraction range. Accordingly, the extraction video that changes along with movement of the extraction range can be stabilized, and the extraction video can be smoothly changed even in a case where a camera shake or the like occurs.

In addition, in the movement processing, the processing portion 30 determines whether or not the moving extraction range approaches the angle-of-view end nearby area within the angle of view (S031). In a case where the extraction range approaches the angle-of-view end nearby area, the processing portion 30 executes the alert processing (S032). Accordingly, the user can be notified that the extraction range approaches near the end of the angle of view.

In a case where the end of the extraction range on the first side reaches the end of the angle of view on the first side by horizontal movement of the extraction range, or in a case where any of the finish conditions (J1) and (J2) is established (S033 and S034), the processing portion 30 finishes the movement processing. At this point, the recording processing may be finished in accordance with the finish of the movement processing, or the recording processing may continue after the finish of the movement processing.

After the finish of the movement processing, in a case where the user horizontally moves the imaging apparatus 10 again to the first side, and the detector 60 detects the motion of the housing 14 at the time of movement, the determination processing in step S027 is executed again. In a case where a determination that the end of the extraction range on the second side reaches the end of the angle of view on the second side is made in the determination processing, the movement processing is executed again, and the series of processing (S028 to S034) is repeated.

Figure 15:
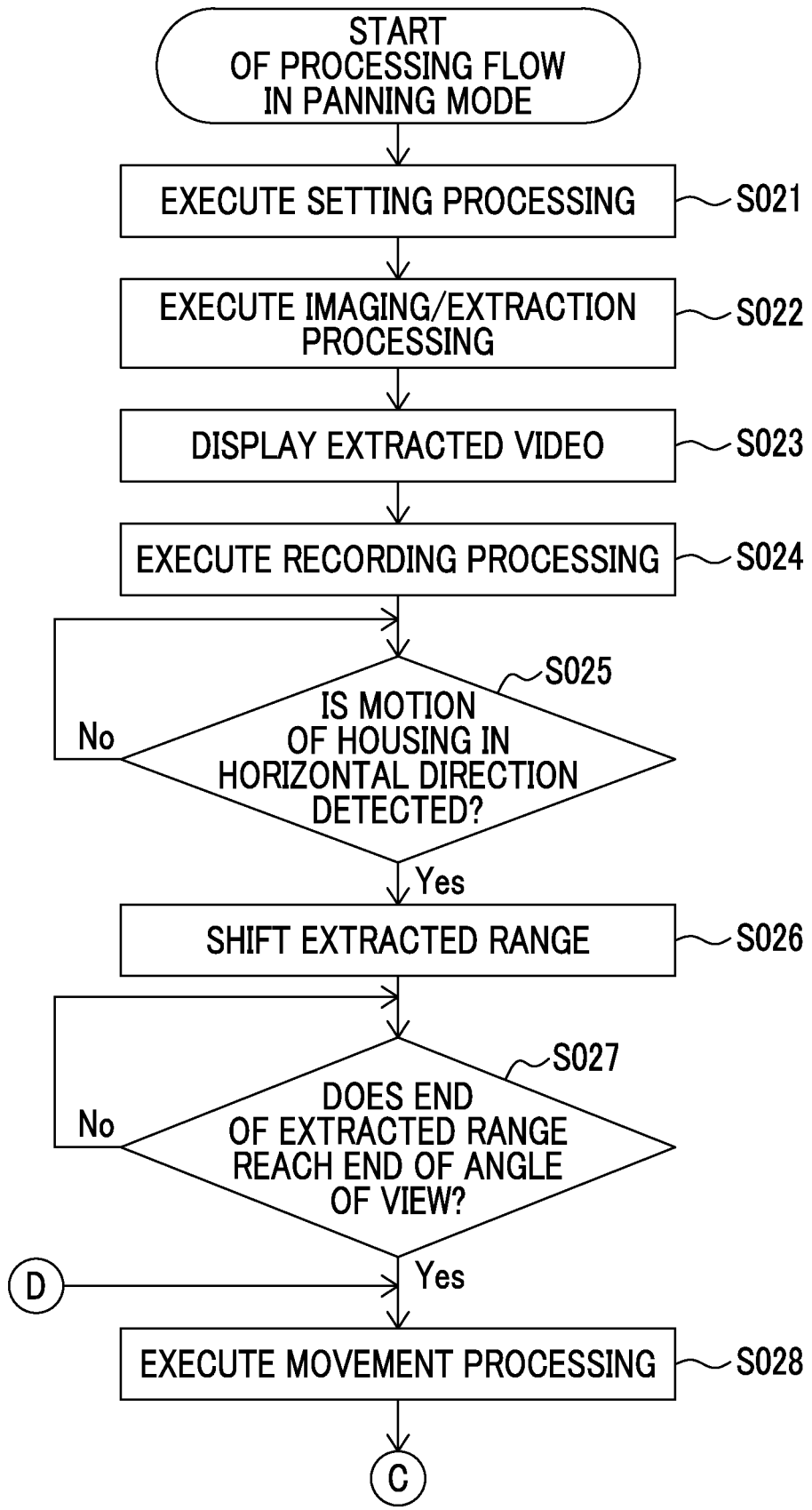
FIG. 15 is a diagram illustrating a processing flow in a case where a panning mode is selected (Part 1).
Figure 16:
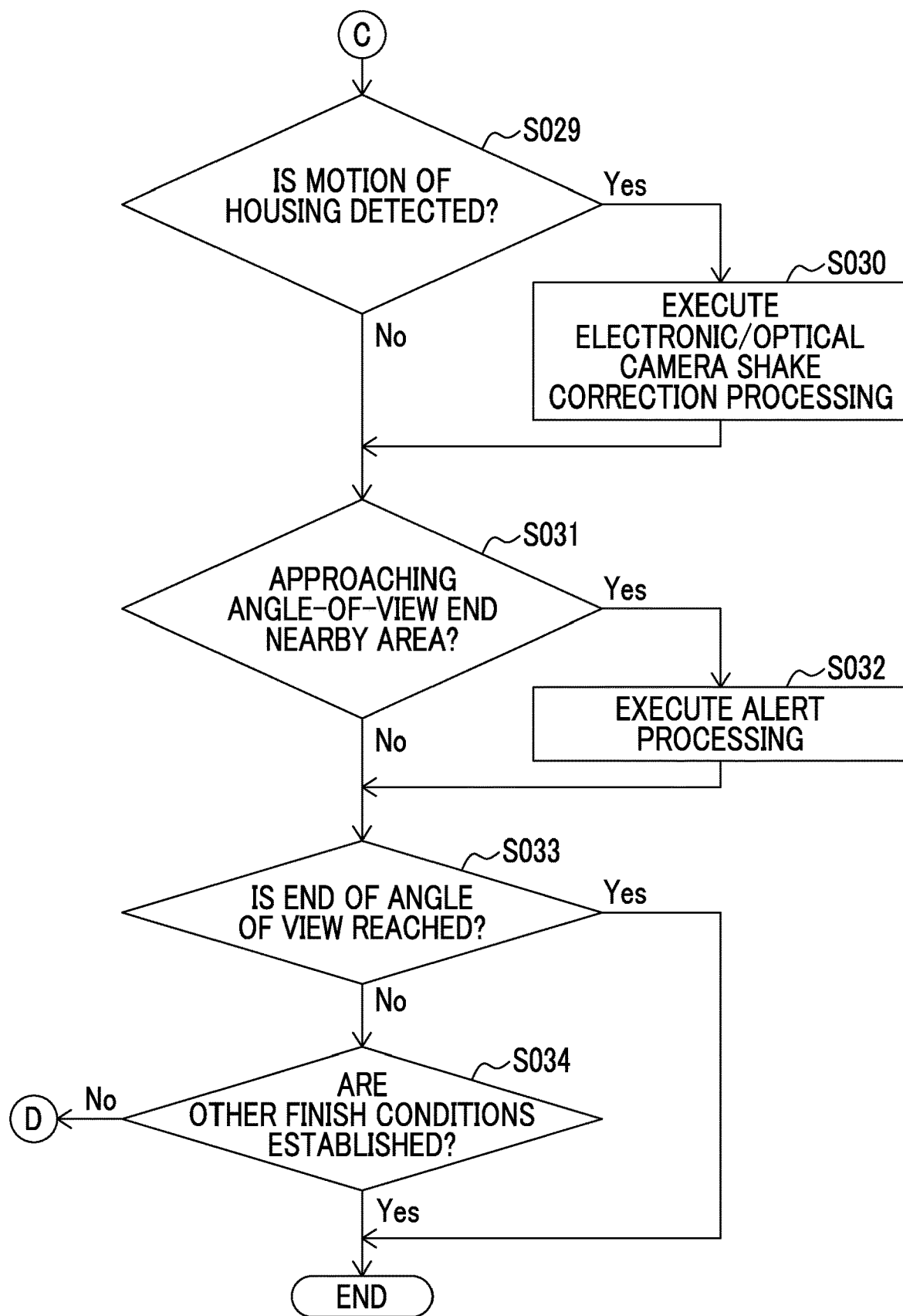
FIG. 16 is a diagram illustrating the processing flow in a case where the panning mode is selected (Part 2).

While description is not provided in the case illustrated in FIGS. 15 and 16, in a case where the panning mode is selected, the zooming (specifically, the electronic zooming and the optical zooming) may be performed on the video of the subject within the extraction video during execution of the movement processing. In this case, the movement speed of the extraction range may be adjusted in accordance with the zooming, and the extraction range may be moved at the movement speed adjusted in accordance with the zooming in the subsequent movement processing.

Other Embodiments

While a specific embodiment of the imaging apparatus according to the embodiment of the present invention is illustratively described so far, the first embodiment is merely an example, and other embodiments are considered. For example, as illustrated in FIG. 17, an imaging apparatus main body 12X of the imaging apparatus and an external monitor 70 may be connected in a wired manner or a wireless manner.

The external monitor 70 is configured with a display device such as a liquid crystal monitor, a recorder including a monitor, or an information processing terminal including a monitor, such as a personal computer, a smartphone, and a tablet terminal.

Figure 17:
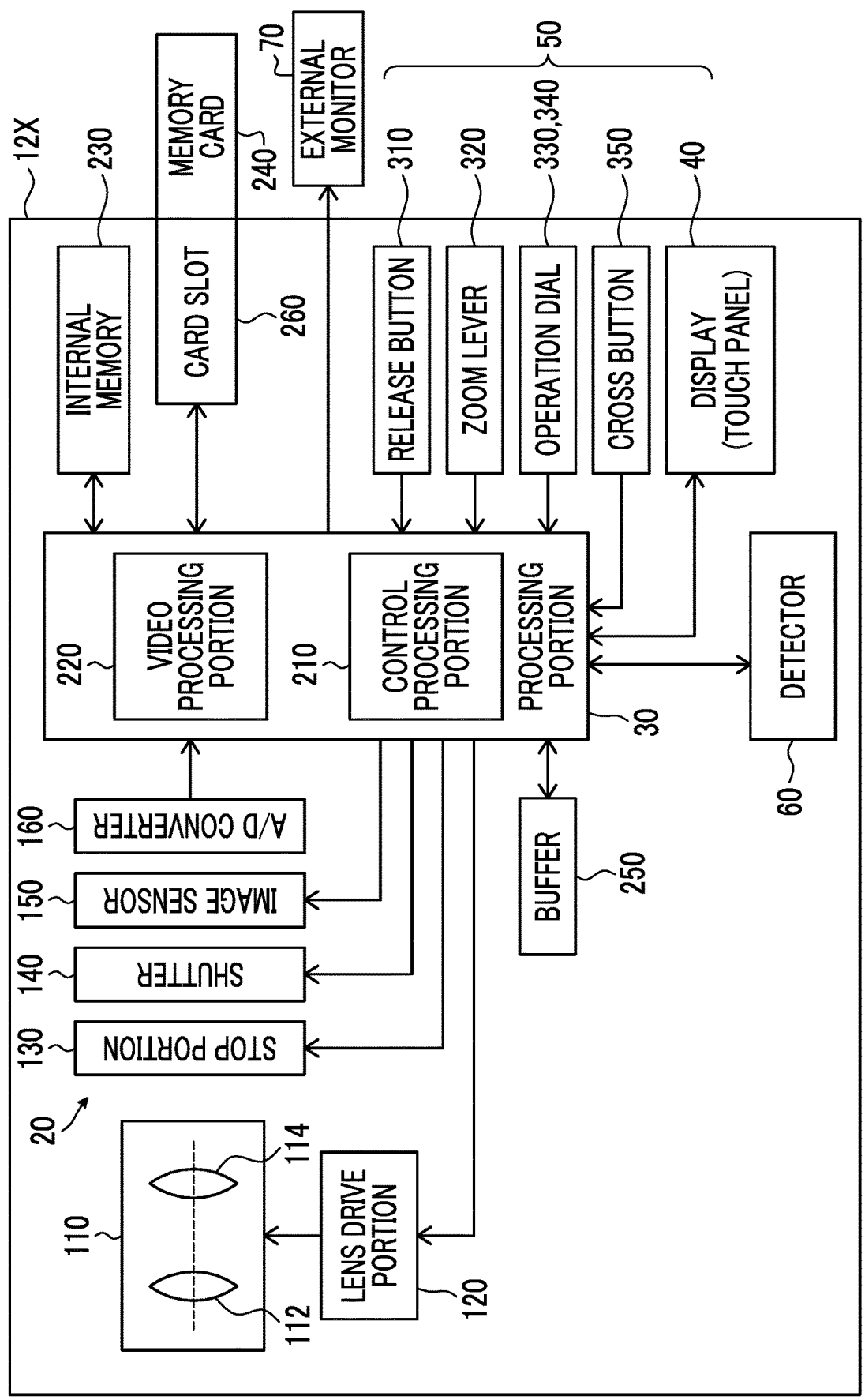
FIG. 17 is a diagram illustrating a configuration of an imaging apparatus main body according to another embodiment of the present invention.

In the configuration illustrated in FIG. 17, the processing portion 30 transmits video signals of the extraction video to the external monitor 70, and the extraction video is displayed on the external monitor 70 side. In this case, the extraction video may be displayed on the external monitor 70 instead of displaying the extraction video on the display 40 (display) of the imaging apparatus. Alternatively, the extraction video may be displayed on both of the display 40 of the imaging apparatus and the external monitor 70.

In addition, in the first embodiment, a case where the housing 14 moves in the horizontal direction, and the detector 60 detects movement of the housing 14 in the horizontal direction as the motion of the housing 14 is illustratively described. However, the present invention is not limited thereto, and the detector 60 may detect movement of the housing 14 in an up-down direction. In this case, the processing portion 30 may move the extraction range in the movement processing in accordance with movement of the housing 14 in the up-down direction detected by the detector 60.

In addition, in the first embodiment, while the extraction range slides in the horizontal direction in the movement processing in a case where the panning mode is selected, the present invention is not limited thereto. For example, the extraction range may slide in the up-down direction in the movement processing.

In addition, in the first embodiment, in a case where the tracking mode is selected, and the user moves the imaging apparatus 10 in order to track the subject, the detector 60 detects the motion of the housing 14 at the time of movement. The processing portion 30 automatically executes the movement processing in connection with detection of the motion of the imaging apparatus 10 and moves the extraction range to track the subject. However, the present invention is not limited thereto. The user may set the subject within the extraction video as the tracking target by operating a touch panel or the like, and the movement processing may be executed based on an operation of issuing an instruction to start processing by the user. Hereinafter, such a case will be described in detail as a second embodiment of the present invention.

A basic configuration of an imaging apparatus according to the second embodiment is approximately the same as the imaging apparatus 10 and is illustrated in FIG. 3. That is, the imaging apparatus according to the second embodiment comprises the imaging portion 20 and the processing portion 30 (processor). The processing portion 30 executes the setting processing, the extraction processing, the movement processing, the zooming processing, and the recording processing.

In the setting processing, the extraction range is set within the angle of view based on contents of initial setting or an instruction operation of the user. The extraction processing is the same processing as the above extraction processing. In this processing, the extraction video captured within the extraction range is extracted. In the second embodiment, for example, the user tracks the subject within the extraction video while changing the angle of view by moving the imaging apparatus, and designates the subject by touching the subject on the touch panel. Accordingly, the designated subject is set as the tracking target.

In the movement processing, the extraction range is moved over time such that the subject of the tracking target enters within the extraction range. By executing such movement processing, the video of the subject is included at all times in the extraction video during movement of the extraction range. In addition, in the movement processing, the extraction range is moved, and the extraction video during movement of the extraction range is displayed on the display 40. In the second embodiment, in a case where the user performs a predetermined button operation or the like after designating the subject of the tracking target, the processing portion 30 executes the movement processing based on the predetermined button operation as a trigger.

The zooming processing includes the electronic zooming processing and the optical zooming processing. In any of the zooming processing, the zooming is performed on the video of the subject within the extraction video. For example, in a case where the subject video ratio changes due to movement of the subject in the depth direction, the processing portion 30 executes the electronic zooming processing in order to change the size of the extraction range in accordance with the distance between the subject and the imaging apparatus. In addition, in a case where the image quality is decreased due to coarse image quality of the extraction video by performing the electronic zooming processing, the processing portion 30 executes the optical zooming processing in order to improve the decreased image quality or displays the notification prompting the user to perform the optical zooming processing on the display 40.

In the recording processing, the extraction video during movement of the extraction range in the movement processing is recorded on the recording medium.

In a case where the zooming processing is executed during the movement processing, the size of the extraction range, that is, the number of pixels of the extraction video, changes before and after the zooming. Meanwhile, it is assumed that the movement speed of the extraction range, that is, the number of pixels through which the extraction range passes per unit time period, is the same before and after the zooming. In this case, the movement speed of the extraction range looks rapidly changing for the user who checks the extraction video through the display 40.

In the second embodiment, in a case where the zooming processing is executed during the movement processing, the processing portion 30 in the movement processing after the zooming processing moves the extraction range at the movement speed corresponding to the zooming (specifically, the electronic zooming or the optical zooming) performed in the zooming processing. Accordingly, a situation in which the movement speed of the extraction range looks rapidly changing due to the zooming can be avoided.

The movement processing of the second embodiment is not limited to a case where the extraction range is moved in order to track the subject. For example, the movement processing may be applied to a case where the extraction range slides from one end to the other end of the angle of view, that is, a case where the panning mode is selected. Even during execution of such movement processing, the zooming processing can be executed. In the movement processing after the zooming processing, the processing portion 30 may move the extraction range at the movement speed corresponding to the zooming.

According to the second embodiment described so far, an imaging method including a setting step, an extraction step, a zooming step, a movement step, and a recording step can be implemented as an imaging method using the imaging apparatus including the imaging portion 20 that captures the reference video which is a motion picture. In the setting step, the extraction range smaller than the angle of view is set within the angle of view in a case of capturing the reference video using the image sensor 150. In the extraction step, the extraction video of the extraction range is extracted from the reference video. In the zooming step, the zooming (the optical zooming or the electronic zooming) is performed on the video of the subject within the extraction video. In the movement step, the extraction range within the angle of view is moved over time at the movement speed corresponding to the zooming performed in the zooming step. In the recording step, the extraction video during movement of the extraction range in the movement step is recorded on the recording medium.

EXPLANATION OF REFERENCES

10: imaging apparatus
12, 12X: imaging apparatus main body
14: housing
20: imaging portion
30: processing portion
40: display
50: operating part
60: detector
70: external monitor
110: lens unit
112: zoom lens
114: focus lens
120: lens drive portion
130: stop portion
140: shutter
150: image sensor
160: A/D converter 210: control processing portion
220: video processing portion
230: internal memory
240: memory card
250: buffer
260: card slot
310: release button
320: zoom lever
330, 340: operation dial
350: cross button
C: vertical axis

What is claimed is:

1. An imaging apparatus comprising:
an image sensor that captures a reference video which is a motion picture;
a housing that accommodates the image sensor;
a detector for detecting a motion of the housing; and
a processor configured to execute
setting processing of setting an extraction range smaller than an angle of view within the angle of view in a case of capturing the reference video,
extraction processing of extracting an extraction video within the extraction range from the reference video,
movement processing of moving the extraction range within the angle of view over time in accordance with the motion detected by the detector, and
recording processing of recording the extraction video during movement of the extraction range in the movement processing on a recording medium,
wherein the processor is configured to, in a case where the detector has detected movement of the housing to a first side of a first direction as the motion, move the extraction range to the first side over time.

2. The imaging apparatus according to claim 1,
wherein the first direction is an up-down direction of the housing.

3. The imaging apparatus according to claim 1, further comprising:
a display that displays the extraction video,
wherein the processor is configured to, in the movement processing, move the extraction range and display the extraction video during movement of the extraction range on the display.

4. The imaging apparatus according to claim 1,
wherein the processor is configured to, in a case where the detector has detected the motion, execute determination processing of determining whether or not an end of the extraction range reaches an end of the angle of view, and
the processor is configured to execute the movement processing in a case where a determination that the end of the extraction range reaches the end of the angle of view is made in the determination processing.

5. The imaging apparatus according to claim 4,
wherein the processor is configured to, in a case where the detector has detected movement of the housing to the first side of the first direction as the motion, determine whether or not an end of the extraction range positioned on a second side opposite to the first side reaches an end of the angle of view positioned on the second side in the determination processing, and
the processor is configured to move the extraction range to the first side in a case where a determination that the end of the extraction range reaches the end of the angle of view is made in the determination processing.

6. The imaging apparatus according to claim 5,
wherein the processor is configured to, in the movement processing, move the extraction range at a movement speed corresponding to a time period from when the movement starts to when the end of the extraction range reaches the end of the angle of view.

7. The imaging apparatus according to claim 1,
wherein the processor is configured to, in a case where the detector has detected the motion, select a subject captured within the extraction video before and after detection of the motion as a tracking target and, in the movement processing, move the extraction range such that the subject enters within the extraction range.

8. The imaging apparatus according to claim 7,
wherein the processor is configured to, in a case where the subject deviates from the angle of view during execution of the movement processing, finish the movement processing.

9. The imaging apparatus according to claim 7,
wherein the processor is configured to, in the movement processing, move the extraction range while changing a size of the extraction range based on a ratio of a size of a video of the subject to the size of the extraction range.

10. The imaging apparatus according to claim 1,
wherein the processor is configured to, in a case where the detector has detected the motion of the housing during execution of the movement processing, further execute camera shake correction processing of performing camera shake correction on the extraction video during movement of the extraction range.

11. The imaging apparatus according to claim 1,
wherein the processor is configured to, in a case where the detector has detected the motion of the housing in a direction opposite to a movement direction of the extraction range during execution of the movement processing, finish the movement processing.

12. The imaging apparatus according to claim 1,
wherein the processor is configured to further execute zooming processing of performing zooming on a video of a subject within the extraction video, and in a case where the zooming processing is executed during execution of the movement processing, adjust a movement speed of the extraction range in accordance with the zooming in the movement processing.

13. The imaging apparatus according to claim 2,
wherein the processor is configured to, in a case where the detector has detected the motion, execute determination processing of determining whether or not an end of the extraction range reaches an end of the angle of view, and
the processor is configured to execute the movement processing in a case where a determination that the end of the extraction range reaches the end of the angle of view is made in the determination processing.

14. The imaging apparatus according to claim 2,
wherein the processor is configured to, in a case where the detector has detected the motion, select a subject captured within the extraction video before and after detection of the motion as a tracking target and, in the movement processing, move the extraction range such that the subject enters within the extraction range.

* * * * *